US007003284B2

(12) United States Patent
Schwartz et al.

(10) Patent No.: US 7,003,284 B2
(45) Date of Patent: Feb. 21, 2006

(54) METHOD AND ARCHITECTURE FOR INTERACTIVE TWO-WAY COMMUNICATION DEVICES TO INTERACT WITH A NETWORK

(75) Inventors: Bruce V. Schwartz, San Mateo, CA (US); Russell S. Greer, Los Gatos, CA (US); Stephen S. Boyle, Fremont, CA (US); Mark A. Fox, San Mateo, CA (US); Alain S. Rossmann, Palo Alto, CA (US); Mark G. Lentczner, Mountain View, CA (US); Andrew L. Laursen, San Mateo, CA (US); Brad E. Sandman, Sunnyvale, CA (US)

(73) Assignee: Openwave Systems Inc., Redwood City, CA (US)

( * ) Notice: Subject to any disclaimer, the term of this patent is extended or adjusted under 35 U.S.C. 154(b) by 609 days.

(21) Appl. No.: 10/142,016

(22) Filed: May 8, 2002

(65) Prior Publication Data

US 2002/0160790 A1 Oct. 31, 2002

Related U.S. Application Data

(63) Continuation of application No. 09/153,322, filed on Sep. 14, 1998, which is a continuation-in-part of application No. 08/570,210, filed on Dec. 11, 1995, now Pat. No. 5,809,415.

(51) Int. Cl.
*H04Q 7/20* (2006.01)
*H04Q 7/38* (2006.01)
*H04Q 7/32* (2006.01)

(52) U.S. Cl. .............. 455/414.1; 455/426.1; 455/412.1; 455/412.2; 455/422.1; 455/466; 379/67.1; 379/100.01; 709/218; 709/219; 709/203; 370/352

(58) Field of Classification Search .......... 455/406, 455/407, 408, 422.1, 426.1, 414.1, 550.1, 455/403, 517, 556.1, 556.2, 557, 426.2, 414.3, 455/445, 410, 411, 412.1, 412.2, 423, 424, 455/425, 466, 500; 379/67.1, 100.11, 100.01; 370/352, 389, 390, 392; 709/218, 219, 203, 709/202, 226, 237
See application file for complete search history.

(56) References Cited

U.S. PATENT DOCUMENTS

| | | |
|---|---|---|
| 4,787,028 A | 11/1988 | Finfrock et al. |
| 4,812,843 A | 3/1989 | Champion, III et al. |
| 5,008,925 A | 4/1991 | Pireh |
| 5,128,672 A | 7/1992 | Kaehler |
| 5,220,674 A | 6/1993 | Morgan et al. |
| 5,329,619 A | 7/1994 | Page et al. |
| 5,335,276 A | 8/1994 | Thompson et al. |
| 5,465,401 A | 11/1995 | Thompson |
| 5,491,605 A | 2/1996 | Hughbanks et al. |
| 5,491,745 A | 2/1996 | Roeder |
| 5,506,961 A | 4/1996 | Carlson et al. |
| 5,548,636 A | 8/1996 | Bannister et al. |
| 5,548,723 A | 8/1996 | Pettus |
| 5,555,446 A | 9/1996 | Jasinski |
| 5,560,008 A | 9/1996 | Johnson et al. |
| 5,577,100 A | 11/1996 | McGregor et al. |
| 5,577,103 A | 11/1996 | Foti |
| 5,577,209 A | 11/1996 | Boyle et al. |
| 5,579,535 A | 11/1996 | Orlen et al. |
| 5,581,595 A | 12/1996 | Iwashita et al. |
| 5,606,786 A | 3/1997 | Presby |
| 5,608,786 A | 3/1997 | Gordon |
| 5,623,605 A | 4/1997 | Keshav et al. |
| 5,625,605 A | 4/1997 | Sullivan et al. |
| 5,634,127 A | 5/1997 | Cloud et al. |
| 5,671,354 A | 9/1997 | Ito et al. |
| 5,673,322 A | 9/1997 | Pepe et al. |
| 5,675,507 A | 10/1997 | Bobo, II |
| 5,708,828 A | 1/1998 | Coleman |
| 5,724,575 A | 3/1998 | Hoover et al. |
| 5,727,159 A | 3/1998 | Kikinis |
| 5,740,252 A | 4/1998 | Minor et al. |
| 5,742,668 A | 4/1998 | Pepe et al. |
| 5,742,905 A * | 4/1998 | Pepe et al. .................. 455/461 |
| 5,745,706 A | 4/1998 | Wolfberg et al. |
| 5,751,798 A | 5/1998 | Mumick et al. |

| | | |
|---|---|---|
| 5,764,910 A | 6/1998 | Shachar |
| 5,809,415 A | 9/1998 | Rossmann |
| 5,812,768 A | 9/1998 | Page et al. |
| 5,822,521 A | 10/1998 | Gartner et al. |
| 5,841,764 A | 11/1998 | Roderique et al. |
| 5,852,717 A | 12/1998 | Bhide et al. |
| 5,854,936 A | 12/1998 | Pickett |
| 5,867,153 A | 2/1999 | Grandcolas et al. |
| 5,884,284 A | 3/1999 | Peters et al. |
| 5,887,249 A | 3/1999 | Schmid |
| 5,909,485 A | 6/1999 | Martin et al. |
| 5,918,013 A | 6/1999 | Mighdoll et al. |
| 5,940,589 A | 8/1999 | Donovan et al. |
| 5,943,399 A | 8/1999 | Bannister et al. |
| 5,958,006 A | 9/1999 | Eggleston et al. |
| 5,995,606 A | 11/1999 | Civanlar et al. |
| 6,009,422 A | 12/1999 | Ciccarelli |
| 6,021,437 A | 2/2000 | Chen et al. |
| 6,023,698 A | 2/2000 | Lavey, Jr. et al. |
| 6,031,904 A | 2/2000 | An et al. |
| 6,035,189 A | 3/2000 | Ali-Vehmas et al. |
| 6,049,711 A | 4/2000 | Ben-Yehezkel et al. |
| 6,049,821 A | 4/2000 | Theriault et al. |
| 6,055,441 A | 4/2000 | Wieand et al. |
| 6,058,422 A | 5/2000 | Ayanoglu et al. |
| 6,065,120 A | 5/2000 | Laursen et al. |
| 6,085,105 A | 7/2000 | Becher |
| 6,108,554 A | 8/2000 | Kawamoto |
| 6,119,137 A | 9/2000 | Smith et al. |
| 6,119,155 A | 9/2000 | Rossmann et al. |
| 6,122,403 A | 9/2000 | Rhoads |
| 6,131,067 A | 10/2000 | Girerd et al. |
| 6,138,158 A | 10/2000 | Boyle et al. |
| 6,157,823 A | 12/2000 | Fougnies et al. |
| 6,161,140 A | 12/2000 | Moriya |
| 6,167,253 A | 12/2000 | Farris et al. |
| 6,185,184 B1 | 2/2001 | Mattaway et al. |
| 6,195,693 B1 | 2/2001 | Berry et al. |
| 6,233,608 B1 | 5/2001 | Laursen et al. |
| 6,237,031 B1 | 5/2001 | Knauerhase et al. |
| 6,247,048 B1 | 6/2001 | Greer et al. |
| 6,263,437 B1 | 7/2001 | Liao et al. |

FOREIGN PATENT DOCUMENTS

| | | |
|---|---|---|
| EP | 0646856 A2 | 4/1995 |
| EP | 0691619 A2 | 1/1996 |
| EP | 0646856 A3 | 12/1996 |
| EP | 0691619 A3 | 6/1997 |
| EP | 0812120 A2 | 12/1997 |
| EP | 0893760 A2 | 1/1999 |
| EP | 0812120 A3 | 5/1999 |
| EP | 0 954 147 A2 | 11/1999 |
| EP | 0 964 590 A2 | 12/1999 |
| JP | 59-41047 | 3/1984 |
| JP | 5-35421 | 2/1993 |
| JP | 5-233191 | 9/1993 |
| JP | 6-110637 | 4/1994 |
| JP | 6-175764 | 6/1994 |
| JP | 7-13671 | 1/1995 |
| JP | 7-263187 | 10/1995 |
| WO | 93/16550 A1 | 8/1993 |
| WO | 96/13814 A1 | 5/1996 |
| WO | 97/14244 A1 | 4/1997 |
| WO | 97/27546 A1 | 7/1997 |
| WO | 97/41654 A1 | 11/1997 |

OTHER PUBLICATIONS

Meyer M. et al., "The On-the-Move Concept for Mobile Middleware", pp. 373-378, Sep. 21,1997, Ericsson Eurolab Deutschland GmbH, Germany, XP-000704489.
HDTP Specification, Version 1.1-Draft, pp. 1-40, Redwood Shores, CA, Unwired Planet, Inc., Jul 15, 1997.
HDML 2.0 Language Reference, Version 2.0, pp. 1-56, Redwood Shores, CA, Unwired Planet, Inc., Jul. 1997.
Japanese Publication, "Nifty Serve", pp. 14, 34, 39, and 158-159 Oct. 5, 1992.
Japanese Article, "Mosaic", Unix Magazine, pp. 36-44, Mar. 1994.
Japanese Publication, "Introduction to HTML-WWW Publishing", pp. 9, 12, 14, 15, 20, 32-34, 162-163, 269, 286, 287, and 270, Jun. 30, 1995.
Japanese Publication, Larry Aronson, "Introduction to HTML", Jul. 1, 1995.
Nekkei Multimedia Magazine, pp. 109-111, Nov. 1995.
Mac Power Magazine, pp. 105 and 268, Jun. 1995.
M. Liljeberg et al., "Optimizing World-Wide Web for Weakly Connected Mobile Workstations: An Indirect Approach" International Workshop on Services in Distributed and Networked Environments, pp. 132-139, Jun. 5, 1995, XP000764774.
M.F. Kaashoek et al., "Dynamic Documents: Mobile Wireless Access to the WWW", pp. 179-184, Dec. 8, 1994, XP0002016896.
S. Gessler et al., "PDAs as mobile WWW Browsers", Computer Networks and ISDN Systems, vol. 28, No. 1, pp. 53-59, Dec. 1, 1995, XP004001210.
G.M. Voelker et al., "Mobisaic: An Information System for a Mobile Wireless Computing Environment", vol. 5, No. 10, pp. 185-190, Jan. 1, 1995, XP002062595.
C. Erlandson et al. "WAP-The Wireless Application Protocol" Ericsson Review No. 4, pp. 150-153, Stockholm, 1998, XP-000792053.
GloMop Group, "GloMop: Global Mobile Computing By Proxy", pp. 1-12, Sep. 13, 1995, University of California, Berkeley, California, XP-002094009.
S.S. Chakraborty, "Mobile Multimedia: In Context to ATM Transport and GSM/GPRS Mobile Access Networks", pp. 1937-1741, Helsinki University of Technology, Espoo, Finland, 1995.
Meyer M. et al., "The On-the-Move Concept for Mobile Middleware", pp. 373-378, Sep. 21, 1997, Ericsson Eurolab Deutschland GmbH, Germany, XP-000704489.

* cited by examiner

*Primary Examiner*—Keith Ferguson
(74) *Attorney, Agent, or Firm*—Blakely, Sokoloff, Taylor & Zafman LLP

(57) ABSTRACT

The invention allows access to the Internet by two-way mobile communication devices capable of wireless communication via a link server. Despite limited computing resources in the mobile devices, the invention allows the mobile devices to interact with Internet entities using a control engine in the link server and an interface engine in the mobile devices. The control engine utilizes the computing resources of the link server and handles tasks requiring considerable computing resources, such as processing of URL requests, interpreting markup language files, managing a data cache and variable states. Working with a message processor in the link server, the control engine communicates with an interface engine using a compact data format that is efficiently transportable in the wireless data network. The interface engine typically performs tasks that do not require considerable computing resources, such as receiving input from users and rendering data received from the link server.

61 Claims, 19 Drawing Sheets

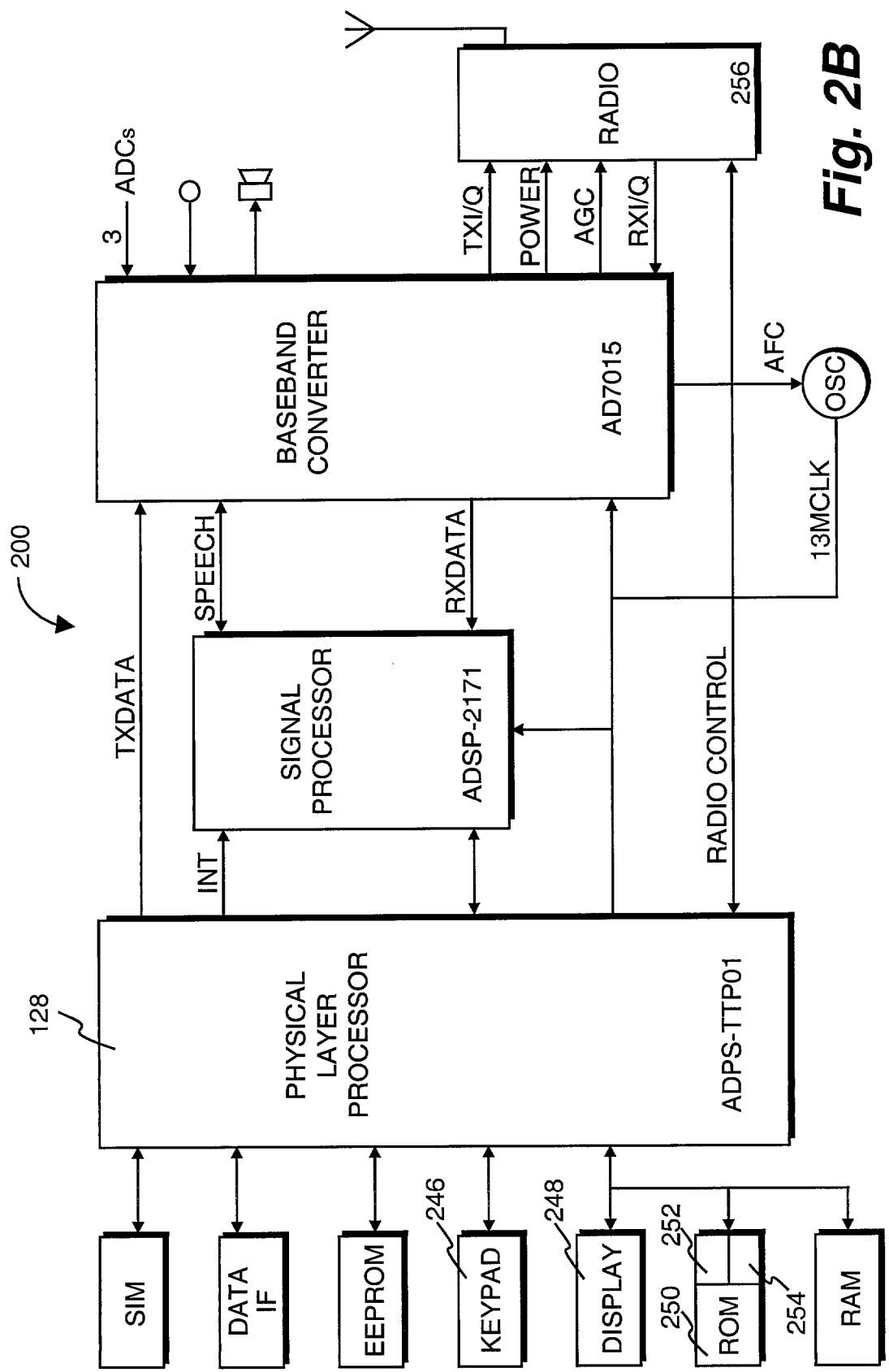

| Device ID | Subscriber ID | Credential | User Info |
|---|---|---|---|
| 6508171453 | 8612234567-10905_pn.mobile.att.net | { Username Password | (CDPD, GSM ....) |
| 204.213.5.56 | 853131117-10905_pn.mobile.att.net | { Username Password | (GSM ....) |
| ••• | ••• | ••• | ••• |

*Fig. 4*

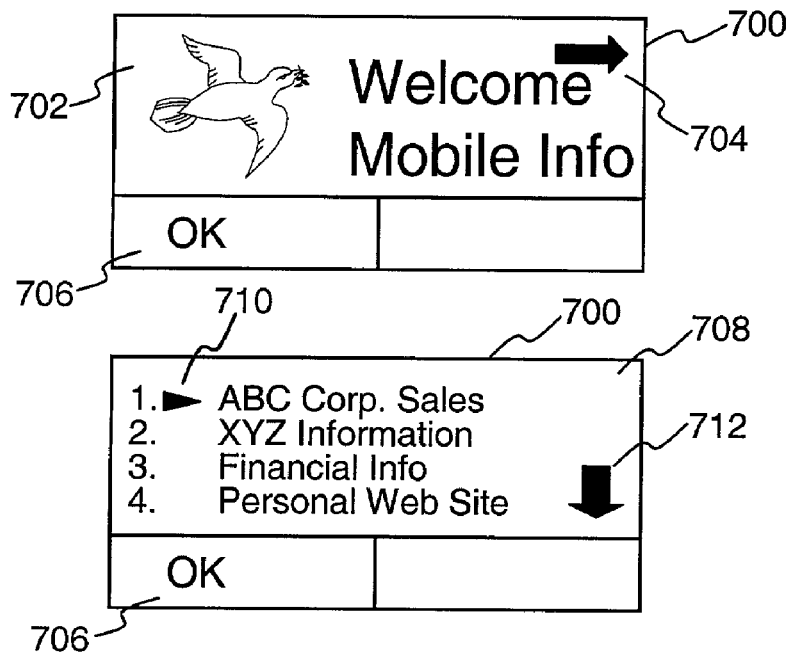
*Fig. 7A*
*Fig. 7B*
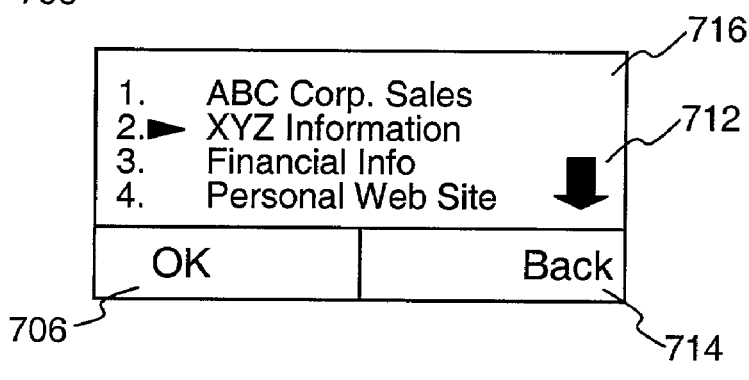
*Fig. 7C*
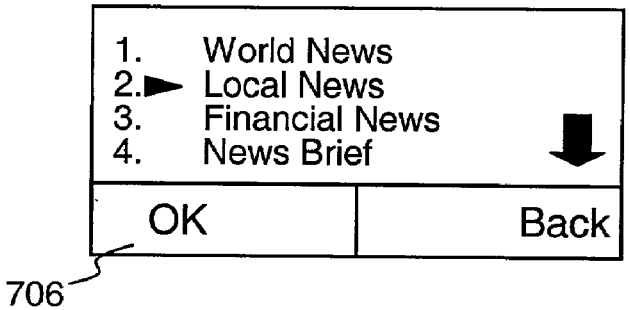
*Fig. 7D*

| User ID | address identifier | Address buffer |
|---------|-------------------|----------------|
| 0192834 | 1234 | http://www.xyzinfo.com/ABCCorp/sales |
| 0192834 | 1235 | http://www.xyzinfo.com/XYZInformation |
| 0192834 | 12ab | http://www.xyzinfo.com/FinancialInfo |
| ... | | |
| 0192eds | abcd | http://www.sjmercury.com/stockquotes |
| ... | | |
| 019wsfd | 1402bvs | http://www.uplanet.com/products |
| ... | | |

*Fig. 8B*

METHOD AND ARCHITECTURE FOR INTERACTIVE TWO-WAY COMMUNICATION DEVICES TO INTERACT WITH A NETWORK

CROSS-REFERENCE TO RELATED APPLICATION

This application is a continuation of U.S. patent application Ser. No. 09/153,322, filed on Sep. 14, 1998, which is a continuation-in-part of U.S. patent application Ser. No. 08/570,210, filed Dec. 12, 1995 now issued as U.S. Pat. No. 5,809,415, entitled "METHOD AND ARCHITECTURE FOR AN INTERACTIVE TWO-WAY DATA COMMUNICATION NETWORK" of Alain Rossmann, each of which is incorporated herein by reference.

AUTHORIZATION WITH RESPECT TO COPYRIGHTS

A portion of the present disclosure contains material subject to copyright protection. Such material includes, but is not limited to, an Appendix entitled "Imp Specification protocols between Femto Engine and Terminal". The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates generally to data communications, and in particular to interactive two-way communication mobile devices that permit a user to interact with a network server providing hypermedia information through a data network. Such a data network can include, for example, the Internet and a wireless network. The mobile devices may include cellular telephones, two-way pagers, or a palm-sized computing devices and typically have limited computing resources.

2. Description of the Related Art

The Internet is a rapidly growing communication network of interconnected computers and computer networks around the world. Together, these connected computers form a vast repository of multimedia information that is readily accessible by the connected computers from anywhere at any time. To navigate a portion of the Internet organized as the "World Wide Web", the connected computers, e.g., workstations and desktop computers, typically operate a user interface called a "browser". A browser is a client application program that generally requests multimedia information throughout the Internet using, typically, the Hypertext Transfer Protocol (HTTP). A computer which operates a browser using HTTP is generally a relatively powerful computer with sufficient computing resources, such as processing power, memory, a display capability and a user interface.

To provide mobility and portability of access to the Internet, interactive two-way communication mobile devices capable of communicating, via wireless data networks, with the Internet have been introduced. The interactive two-way communication mobile devices (e.g., two-way pagers, cellular phones, palm-sized computing devices and personal digital assistants (PDAs)) are among the fastest emerging communication devices. These devices enable users to receive, collect, analyze, review and disseminate information as the users travel or move about. Unlike computers coupled to the Internet, the mobile devices are characterized by severe limitations in computing resources. For example, a cellular phone has less than one percent processing power of a typical desktop personal computer, generally less than 128 kilobytes of memory, an LCD display which is perhaps four lines high by twelve or twenty characters, and limited or non-existent graphics capabilities. Further, a cellular phone inputs using a keypad that has far fewer keys than a typical personal computer (PC) keyboard. With these constraints, a mobile device cannot efficiently operate the browser used by desktop computers to navigate the Internet.

To make available to mobile devices computing resources comparable to a desktop computer is too costly. There is, therefore, a great need for a solution that enables mobile devices to freely access information on the Internet without providing these computing resources in the mobile devices.

Additionally, mobile devices are typically serviced through one or more wireless service carriers. The wireless service carriers often provide additional services by upgrading client application programs in the mobile devices. In conventional computers, an upgrade can be accomplished by downloading a new version of an application program from a service provider. In mobile devices, downloading a new version of an application program can be a prohibitive task, limited by the performances of the computing resources and the wireless network. Hence, there is a further need for an ability to manage client application programs operated by the mobile devices.

SUMMARY OF THE INVENTION

The present invention includes a method and corresponding apparatus wherein the method in one embodiment of the invention is characterized as follows: A first resource request is received a link system from a thin-client mobile device over a wireless network. A control engine in the link system is used to process the first resource request, and a message is received at the link system from a resource on a landnet, the message corresponding to the first resource request. The message is converted in the link system to a more compact format to facilitate transmission of the message over the wireless network. The message is for use by an interface engine in the thin-client mobile device to render information on a display device of the thin-client mobile device, wherein the interface engine uses substantially less computing resources than the control engine.

Other objects, together with the foregoing are attained in the exercise of the invention in the following description and resulting in the embodiment illustrated in the accompanying drawings.

BRIEF DESCRIPTION OF THE DRAWINGS

The present invention will be readily understood by the following detailed description in conjunction with the accompanying drawings, wherein like reference numerals designate like structural elements, and in which:

FIG. 2B illustrates an internal functional block diagram of an exemplary digital cellular phone that may corresponds to the GSM digital cellular phone of FIG. 2A;

FIG. 4 depicts an account structure used in the description of the present invention;

FIGS. 7A to 7G illustrate a series of screen displays to illustrate the navigation of the Internet through a mobile device according to the present invention;

FIG. 8B demonstrates an address table managed by an account manager to maintain groups of address identifiers in a link server for all the mobile devices in communication with the link server.

DETAILED DESCRIPTION OF THE INVENTION

Figure 1:
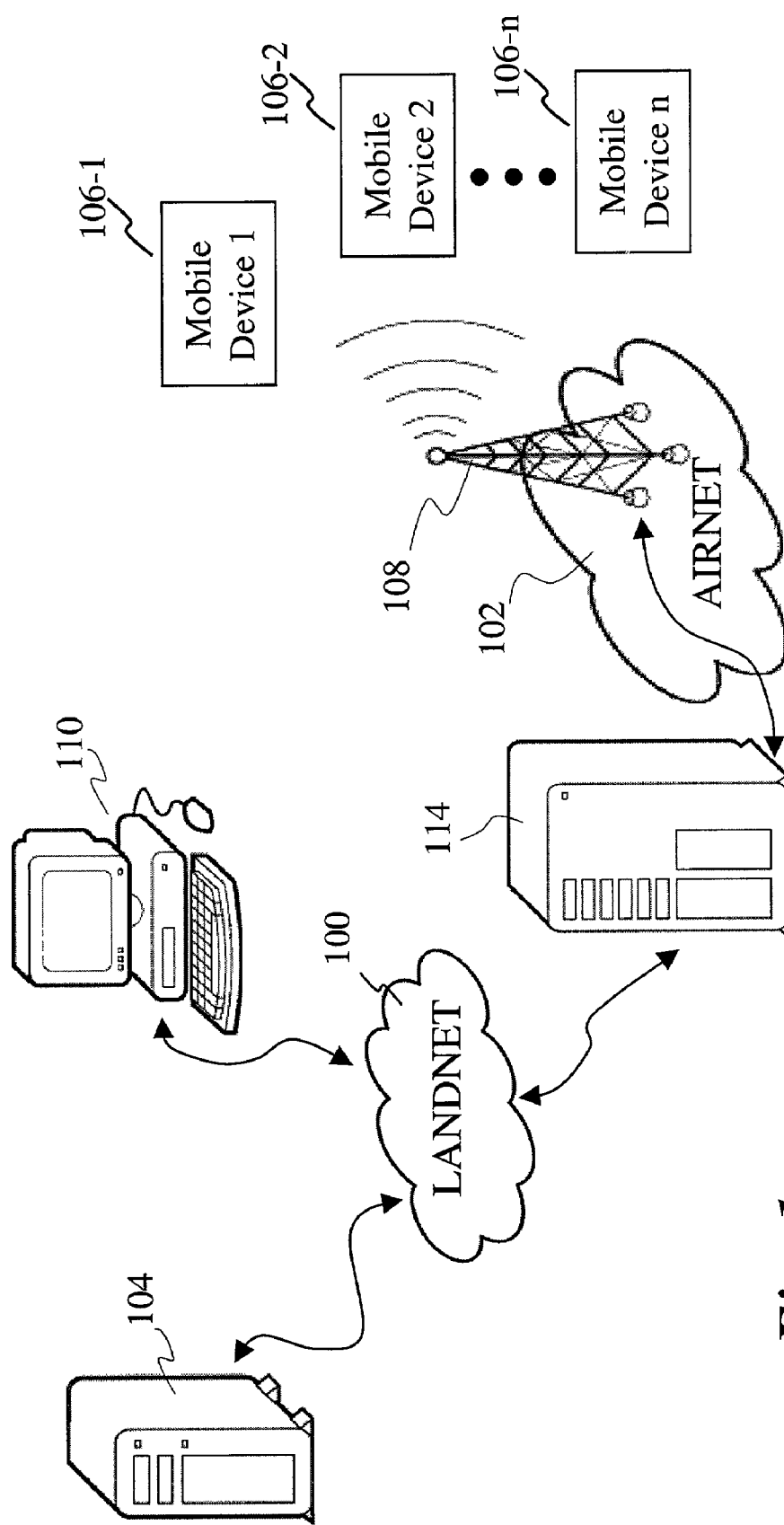
FIG. 1 illustrates a schematic configuration in which the present invention may be practiced.

Referring now to the drawings, in which like numerals refer to like parts throughout the several views. FIG. 1 illustrates a schematic configuration in which the present invention may be practiced. As shown in FIG. 1, landnet 100 is a land-based network that may be the Internet, an Intranet or a data network of any private network. Coupled to landnet 100 are a personal computer (PC) 110 and a network server 104. Personal computer 110 may be a Pentium II-based desktop personal computer. Preferably, personal computer 110 runs a HyperText Markup Language (HTML) browser, such as Netscape Navigator from Netscape Communications Corporation (http://www.netscape.com), via landnet 100 using HyperText Transfer Protocol (HTTP) to access information stored in network server 104, which may be a workstation from SUN Microsystems Inc (http://www.sun.com/). The information stored in network server 104 may be hypermedia information including mobile data designed for mobile devices.

There are n mobile devices 106 serviced by airnet 102. Mobile devices 106 are interactive two-way communication devices (e.g., mobile computing devices, cellular phones, palm-sized computing devices with PDA (Personal Data Assistants) functionality and Internet-capable appliance remote controllers) which are capable of communicating wirelessly with antenna 108 via airnet 102. As shown, antenna 108 also represents a wireless carrier infrastructure that generally includes a base station and an operations and maintenance center. The base station controls radio or telecommunication links with mobile devices 106. The operations and maintenance center comprises a mobile switching center performing the switching of calls between the mobile devices and other fixed or mobile network users. Further the operations and maintenance center manages mobile account services, such as authentication, and oversees the proper operation and setup of the wireless network. Each of the hardware components and processes in carrier infrastructure 108 are known to those skilled in the art and thus are not described here to avoid unnecessarily obscuring aspects of the present invention.

Between landnet 100 and airnet 102 there is a link server device 114 functioning as a bridge between the two networks 100 and 102. Link server device 114, which is also referred to as proxy server or wireless data server or network gateway server, may be a workstation or a personal computer. Link server 114, which is loaded with many processes including compiled and linked versions implementing the present invention, couples airnet 102 to landnet 100 and performs many functions as described in more detail below. One of the functions that link server 114 performs is to facilitate the communication of mobile devices 106 with any of the devices coupled to landnet 100, including mapping or translating from one communication protocol in landnet 100 to another in airnet 102 or vice versa.

Figure 2A:
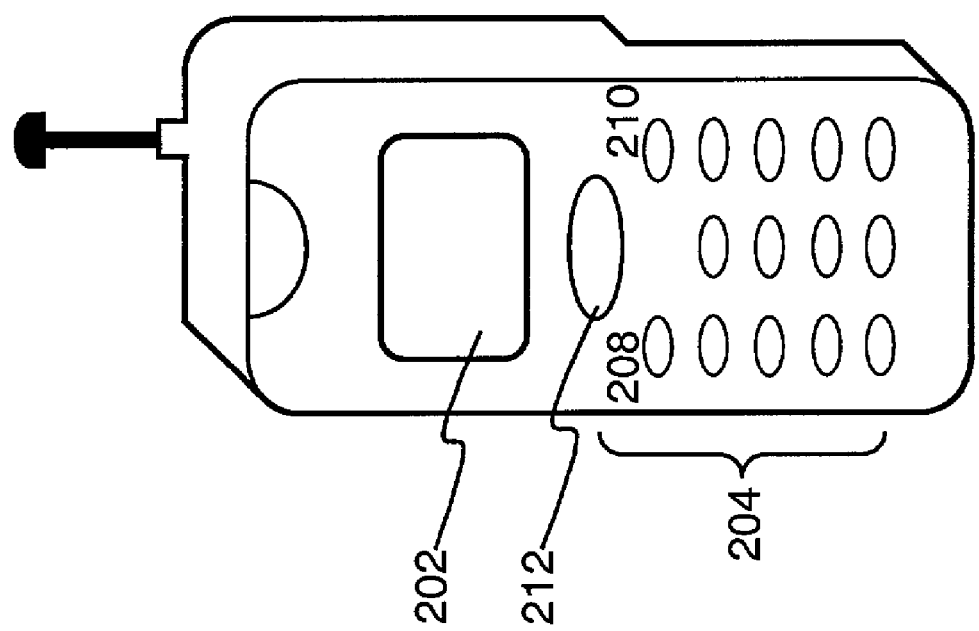
FIG. 2A depicts a block diagram of a typical GSM digital cellular phone that can be used in the data network of FIG. 1 to practice the present invention.

To facilitate the description of the present invention, FIG. 2A depicts a typical GSM digital cellular phone 200 that can be used as one of the mobile devices 106 in the arrangement of FIG. 1 to practice the present invention. Cellular phone 200 includes a small screen 202 and an extended phone keypad 204. Screen 202 is typically a LCD display capable of displaying perhaps four lines high by twelve or twenty characters with limited graphics capabilities. Extended phone keypad 204 includes, preferably, a regular phone keypad 206, a pair of generic keys 208 and 210 and positioning key 212. Generic keys 208 and 210 are used to activate soft keys displayed in screen 202 and positioning key 212 is to reposition an element indicator or a cursor to activate, for example, one of the hyperlinks displayed in screen 202. Generic keys 208 and 210 and positioning key 212 are not necessary in practicing the present invention. These keys can be replaced by a set of designated keys in regular phone keypad 206 but provide preferred convenient means for a user to interact efficiently with the phone 200. Further, having a regular phone keypad is not a requirement to practice the present invention. Some of the mobile devices have no physical keys at all, such as those palm-size computing devices that use "soft keys" or icons for receiving user input data. In the following, unless otherwise specifically described, keys or buttons are generally referred to as either physical keys or soft keys.

FIG. 2B illustrates a functional block diagram of digital cellular phone 200. Since each of the hardware components in digital cellular phone 200 is known to those skilled in the art, the hardware components are not described in detail. Besides keypad circuit 246 for keypad 204 and display drive 248 for display screen 202, the main components in digital cellular phone 200 also include a random access memory (RAM), a read-only memory (ROM) and a physical layer processor or microcontroller 128. According to one embodiment, compiled and linked processes of the present invention are stored in ROM 250 as a client module 252 and a support module 254. Upon activation of a predetermined key sequence utilizing keypad 204, physical layer processor 128 causes client module 252 to communicate with link server 114 of FIG. 1 via a radio transceiver 256.

It is generally understood that a computing device equipped with an HTML browser using HTTP can access hypermedia information in a network server. However, HTTP requires considerable computing power and network bandwidth resources. For example, a request from a computing device to establish a communication session with a network server may require an exchange of a number of data packets. In addition to the resources required to implement HTTP, significant resources must be supported in the computing device to request, format, process and display information. This is not a significant disadvantage in many situations because the computing device, including personal computers and workstations coupled to a network operating HTTP, generally has sufficient computing power, memory and display capabilities.

Nevertheless, cellular phone 200 or mobile devices 106 of FIG. 1 typically do not have the computing resources to implement HTTP to run an HTML browser. The computing power in cellular phone 200 or mobile devices 106 of FIG. 1 is typically less than one percent of a laptop personal computer's computing power, the memory capacity is generally less than 128 kilobytes and the graphics display capability is very limited. Cellular phone 200 or any of mobile devices 106 of FIG. 1 is not a replacement of a desktop computing device or the combination of a wireless communication module and a personal computer. Further, making a mobile device, such as cellular phone 200, capable of navigating hypermedia information in a network server is a significant departure from prior art systems.

Figure 3A:
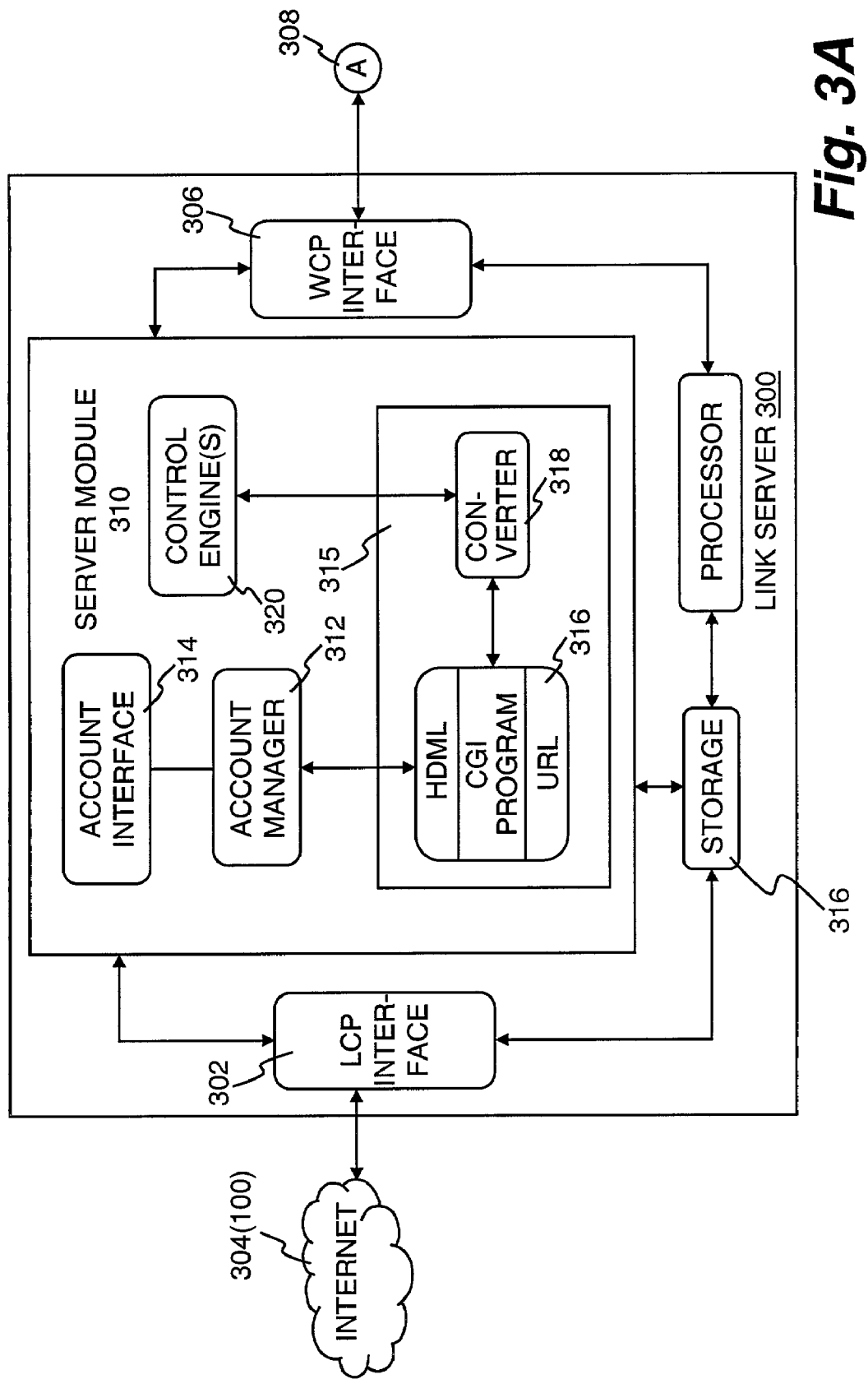
FIGS. 3A and 3B illustrate functional block diagrams of a link server device and a mobile device according to an embodiment of the present invention.
Figure 3B:
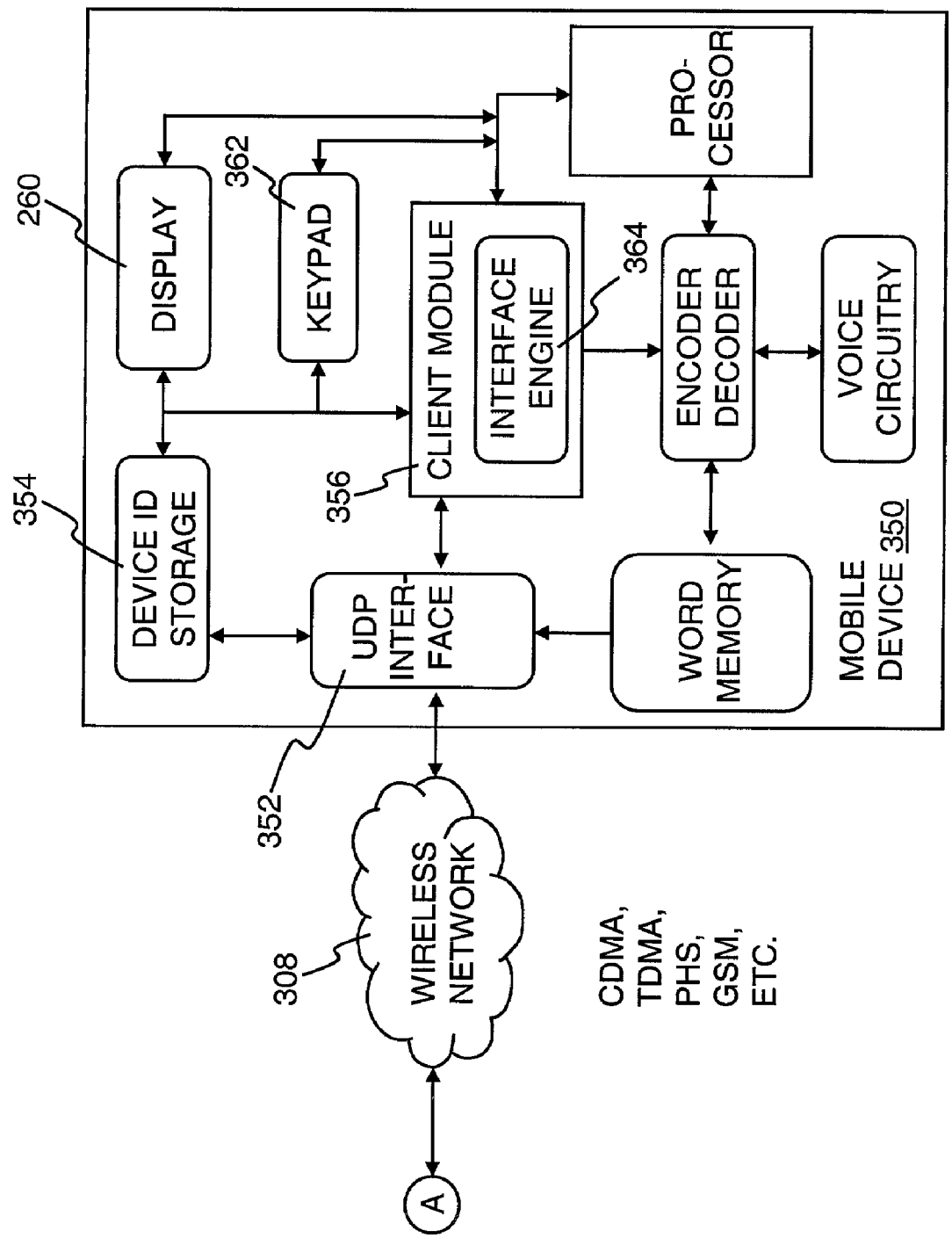

Referring now to FIGS. 3A and 3B, there are respectively shown functional block diagrams of a link server device and a mobile device according to an embodiment of the present invention. Link server device, or simply link server 300, that may represent link server 102 of FIG. 1, is typically a server computer. Mobile device 350 may, for example, correspond to one of mobile devices 106 of FIG. 1 or cellular phone 200 of FIG. 2. To avoid obscuring any aspect of the present invention, well known methods, procedures, components and circuitry in link server 300 and mobile device 350 are not described in detail.

Link server 300 includes a landnet communication protocol (LCP) interface 302 that couples to landnet 304, and a wireless communication protocol (WCP) interface 306 that couples to a wireless network 308 via a carrier's infrastructure (not shown in the figure). LCP interface 302 implements a communication protocol operated in landnet 304. Generally, landnet 304 operates HTTP, so that LCP interface 302 is typically an HTTP interface. Similarly, wireless network 308 may operate a wireless communication protocol suitable for the characteristics of a wireless network. One of the available wireless communication protocols is Handheld Device Transport Protocol (HDTP) (formerly known as Secure Uplink Gateway Protocol (SUGP)), which runs on User Datagram Protocol (UDP). In this embodiment, WCP interface 306 is implemented with a UDP or HDTP interface. HDTP is developed by Openwave Systems Inc. (formerly Unwired Planet, Inc.) located at 140 Seaport Boulevard, Redwood City, Calif. 94063. The specifications of HDTP, entitled "HDTP Specification" is enclosed and incorporated herein by reference in its entirety.

To facilitate the description of the present invention, the wireless communication protocol in use is HDTP. The present invention is, however, not limited by this exemplary communication protocol.

HDTP is a session-level protocol that resembles HTTP but runs on UDP and without incurring the overhead of HTTP/TCP and is highly optimized for use in thin devices, such as the mobile devices, that have significantly less computing power and memory than those of a desktop personal computer. Further, UDP does not require a connection to be established between a client device and a server before information can be exchanged, which eliminates the need of exchanging a large number of packets during a session creation. Exchanging a very small number of packets during a transaction is one of the desired features for a mobile device with limited computing power and memory to effectively interact with a landline device.

Link server 300 further comprises a server module 310 coupled between LCP interface 302 and WCP interface 306. Server module 310, which is typically loaded in a memory, performs traditional server processing as well as protocol conversion processing from one communication protocol to another communication protocol. In particular, the protocol conversion processing includes protocol conversion between HDTP/UDP and HTTP/TCP according to one embodiment.

In server module 310, account manager 312 manages through account interface 314 a number of user accounts for all the mobile devices serviced by link server 300. Each of the mobile devices, such as 350, is assigned a device identification (ID). Device ID can be a phone number of the device or an IP address or a combination of an IP address and a port number, for example: 204.163.165.132:01905 where 204.163.165.132 is the IP address and 01905 is the port number. The device ID is further associated with a subscriber ID created and administrated by a carrier in link server 300 as part of the procedures to activate a subscriber account for mobile device 350. The subscriber ID may take the form of, for example, 861234567-10900_pn.mobile.att-.net by AT&T Wireless Service, and is a unique identification to a mobile device. In other words, each of mobile devices 106 serviced by link server 114 in FIG. 1 has a unique device ID that corresponds to a respective user account in link server 114. Additionally, account manager 312 is responsible for creating a user account for a mobile device that anonymously communicates with link server 114. In this case, account manager 312 ensures proper (limited) access of the anonymous mobile device to services provided by link server 114.

FIG. 4 shows an exemplary structure 400 of the user accounts managed by account manager 312. It should be noted that the user accounts need not be physically located in link server 300. In fact, the user accounts can be remotely located in one of the computing devices coupled to the landnet 104. Through account interface 314 that has proper and secure access to the user accounts, account manager 312 can conduct the duties of account management, as discussed in further detail below. Device ID column 402 is filled with the device IDs of mobile devices that correspond to subscriber IDs in subscriber ID column 404. Credential information column 406 lists credential information needed to access each associated account. User info 408 may include the account configuration information, for example, device ID "6508171453" is a mobile phone that is pre-configured to work in a CDPD network and, probably, may be provided with an option to switch to a GSM network if necessary. Further entries in user info column 408 may include pointers or linkages 410 to other account-related information, such as system parameters, encryption schemes, call plan and customer service information that can be accessed by the mobile device.

Returning now to FIGS. 3A and 3B, a database of user accounts permits account manager 312 to authenticate and to verify the subscribed mobile devices and to control access to provided services by all mobile devices (subscribed or anonymous devices) via wireless data network 308. More importantly in the present invention, account manager 312 is responsible for managing the operations of control engines 320, which are respectively and independently designated to one mobile device. The detailed operations of control engines 320 are provided below.

The following description is focused on mobile device 350 and its associated account. However, the present description is equally applicable to any mobile device in communication with link server 300.

In addition, server module 310 includes message processor 315, which includes a message digester 316 and a converter 318. Message processor 315 processes messages communicated between a network server and link server 300 and generates for each message a corresponding compact message to be communicated between link server 300 and mobile device 350. In particular, message digester 316 receives the messages from the network server and performs a sequence of message processing that include interpretation and management of the messages. Converter 318 converts the messages, according to the interpretation, to a data format that is compact enough to be efficiently transportable over wireless network 308. The messages received from the network server are typically markup language files or data, requests, notifications and other commands that could cause mobile device 350 to respond as desired in the received messages. The markup language may include, for example, Handheld Device Markup Language (HDML), HyperText Markup Language (HTML), compact HTML, Wireless Markup Language (WML), Standard Generalized Markup Language (SGML) and Extensible Markup Language (XML).

For example, LCP interface 302 receives an HDML file from a financial network server that directs mobile device 350 to display a pre-designed screen, in response to mobile device 350's request to the financial network server. The exemplary HDML file is listed as follows:

```
<HDML VERSION=2.0>
    <DISPLAY NAME>
        <ACTION TYPE=ACCEPT TASK=GO DEST=#card2>
        Dow has hit 20,000 today !
        Nasdaq has popped 20%.
        Detailed Financial Headlines
    </DISPLAY>
</HDML>
```

Figure 5:
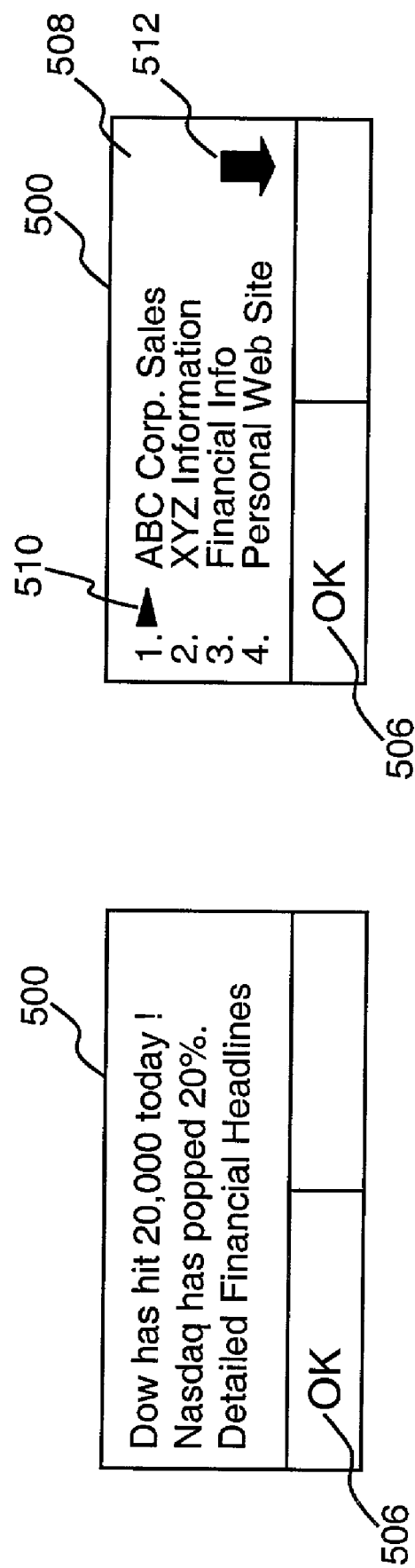
FIGS. 5A and 5B illustrate respectively two exemplary screen displays on a display screen of a mobile device.

The screen display corresponding to this HDML file is shown in FIG. 5A. If a user selects the "OK" soft key, a list of the detailed financial news packaged in one or more HDML files would be fetched (pulled) from the financial network server and displayed, as shown in FIG. 5B. As used herein, a display screen or screen is the physical display apparatus in a device, such as a 4 by 20 character LCD screen in a mobile device or 2.5 inch by 3.5 inch touch LCD screen in a palm-sized computer. A screen display is the image presented on the display screen. As shown in FIG. 5B, display screen 500 shows a list of choices with element indicator 510 pointing to the first choice. Pointer 512 indicates that screen display 508 has more items to be displayed but limited by the size of display screen 500.

As described above, mobile device 350 typically does not have the necessary computing power and memory to operate a browser in response to the HDML files. Therefore, an HDML file received is first analyzed by message digester 316 and then converted through converter 318 into a set of screen commands that cause a mobile device, upon receiving the screen commands, to display the contents in the HDML file according to the screen commands. Typically, the screen commands are expressed in a form of screen description data (SDD) that is rendered in an interface engine in mobile device 350. The following is an example of an SDD stream:

c353 c836 e003 446f 7754 0368 6173 5803 6869 74e0 0632 302c 3030 3057 0574 6f64 6179 e001 2152 0844 6574 6169 6c65 64e0 0946 696e 616e 6369 616c e009 4865 6164 6c69 6e65 73ff which is considerably smaller than the corresponding HDML file. The "ASCII-like" representation of the above illustrated SDD file is:

type=screen seq-num=54
<WRAP>"Dow" offset=4 "has" offset=8 "hit"
<WRAP>"20,000" offset=7 "today"
<WRAP>"!" offset=2 "Detailed"
<WRAP>"Financial"
<WRAP>"Headlines"
<end>

Transmission of a smaller data file is important in wireless data networks that are characterized with low bandwidth and expensive airtime. According to one embodiment, the SDD file is a group of Imp data, the detailed specification of the Imp data is provided in the Appendix entitled "Imp Specification protocols between Femto Engine and Terminal", which is hereby incorporated by reference for all purposes in its entirety. There are a set of rules or grammars in the Imp data that an interface engine, upon rendering the Imp data, causes a screen to display the contents of the corresponding markup language file.

In other words, the actual data being exchanged between link server 300 and mobile device 350 is in SDD format, which is typically binary and can be communicated more compactly and efficiently in wireless network 308. Further SDD files can be directly rendered by an interface engine in mobile device 350 without further processing. Nevertheless, the above procedures are provided for illustrative purpose only and the present invention is not limited to the Imp data format. According to another embodiment, the message processor does not have a pair of separate message digester and converter, a markup language file in HDML, compact HTML or XML is received at the message processor and converted into a corresponding binary file that is much smaller in size and may be in Imp, cHDML, cHTML, or cXML, wherein "c" means stripped, compressed, compiled or converted version of the corresponding markup files.

To interact with mobile device 350, server module 310 further includes control engine 320. Control engine 320 works in conjunction with an interface engine in mobile device 350 and further with message processor 315 to interpret actions from mobile device 350 in the present embodiment. More detailed description of the interactions between the interface engine in mobile device 350 and control engine 320 in server module 310 is given below.

Mobile device 350 includes a corresponding WCP interface 352 that couples to airnet 308 via a RF transceiver (not shown in the figure) to receive incoming and outgoing data signals. WCP interface 352 is implemented with a UDP interface, as is WCP interface 306, when wireless network 308 operates HDTP. When another wireless communication protocol is operated in wireless network 308, both WCP interface 352 and WCP interface 306 are readily implemented accordingly so that link server 300 and mobile device 350 can communicate with each other.

Device identifier (ID) storage 354 supplies a device ID to WCP interface 352. The device ID identifies a mobile device 350 and directly corresponds to the device ID in the user account in link server 300. In addition, mobile device 350 includes a client module 356 that performs many of the processing tasks performed by the mobile device 350. Such processing tasks include establishing a communication session with line server 300 via carrier network 308, requesting and receiving data from carrier network 308, displaying information on a display screen 360, and receiving user input data. Specifically, client module 356 is coupled to WCP interface 352 to establish a communication session and to request and receive data. Additionally, Client module 356 operates, among other things, an interface engine 364 that typically receives the screen description data from link server 300 and causes display drive 260 to display on the display screen what is intended in the HDML file originally received from the network server.

As mentioned above, in prior art systems, terminal devices typically run a local browser such as the one from Netscape or Microsoft to interact with the Internet. The present invention, however, uses an interface engine in a terminal device and a control engine in a proxy server. In other words, the present invention uses an interface engine demanding little computing resources in a wireless mobile device and a control engine utilizing sufficient computing resources provided in a server device to allow the mobile device to effectively interact with a network server. Further, working with the control engine in the link server, the interface engine in the mobile device does not need considerable computing power or memory to cache, parse, process and display a markup language file.

Figure 6:
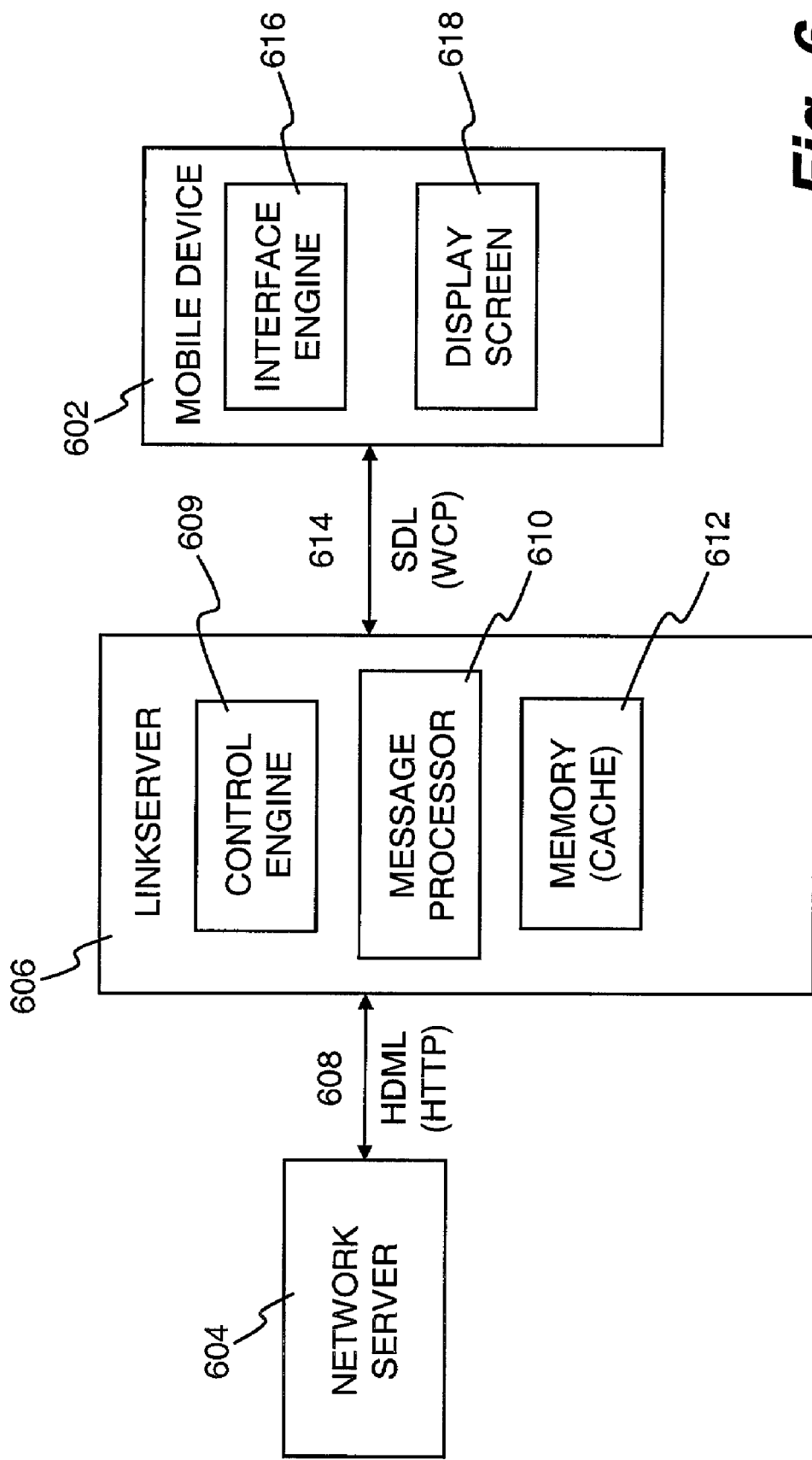
FIG. 6 demonstrates an overview of a systematic configuration according to the present invention.

To facilitate further description of the present invention, FIG. 6 demonstrates an overview of a systematic configuration according to the present invention and should be understood in conjunction with FIG. 3. FIG. 6 shows that a mobile device 602 communicates with a network server 604 via link server device 606. Network server 604, or sometimes called service server, may be any server on the Internet that provides accessible hypermedia information. Mobile device 602 and link server 606 may correspond respectively to mobile device 350 and link server 300 in FIG. 3. Service server 604 having an IP address, for example, www.abc-news.com, provides hypermedia information to network 608 so that computing devices coupled to network 608 can access the information in service server 604.

According to one embodiment, the information in network server 604 is a World Wide Web page that may be authored in HDML and fetched over network 608 operating HTTP. From the perspective of mobile device 602 that ultimately receives the information, link server 606 receives the HDML files that are then processed by message processor 610 and converted to screen description data according to the device characteristics of mobile device 602. The device characteristics may include the type and size of display screen and other information passed over link server 606 when a communication session is established between mobile device 602 and link server 606. Generally, a request to establish the communication session can be initiated by either mobile device 602 or link server 606. During the process of exchanging authentication information, the data carrying the device characteristics of mobile device 602 is received and maintained in link server 606 such that the screen description data is generated in accordance with the device characteristics of mobile device 602. The detailed description of initiating the request and the processing of exchanging information so as to subsequently establish a secure and authenticated communication session is described in commonly assigned U.S. patent application Ser. No. 08/966,988 entitled "Method and System for Secure Lightweight Transactions in Wireless Data Networks" by Hanqing Liao et al, which is hereby incorporated by reference in its entirety.

With the established communication session, the screen description data are then forwarded to mobile device 602 over wireless network 614 operating a wireless communication protocol. Upon receiving and rendering the screen description data, interface engine 616 causes display screen 618 to display the information embedded in the screen description data.

FIGS. 7A through 7G show the processes of navigation requests by mobile device 602 of FIG. 6 and fetching requested information from service server 604 and forwarding the information subsequently from link server 606 to mobile device 602.

Prior to describing FIGS. 7A through 7G, some of the features in HDML are recited. Similar to HTML, HDML is a tag-based document markup language which includes a set of commands or statements specified in a card that defines how information is displayed on a small screen. Normally a number of cards are grouped into a deck that is the smallest unit of HDML information that can be exchanged between network server 604 and link server 606 over landnet 608. The HDML specification entitled "HDML 2.0 Language Reference" is enclosed and incorporated herein by reference in its entirety.

According to one embodiment of the HDML, there are four typical types of cards: a display card, a choice card, an entry card, and a no-display card. A display card gives information to be displayed to the user. The displayed content can include any one of, or any combination of text, image, and soft keys. A choice card displays a list of choices to the user. The choices are presented in a format specified on the choice card and are generally numbered sequentially. As explained above, the user selects a choice by depressing a corresponding key. An entry card is used to obtain input data from the user. An entry card displays one or more entry lines. The entry line, in this embodiment, can be used to receive either numeric or text data. A no-display card is a hidden card which is not displayed. The no-display card is normally used to execute an intermediate action and generally not known to a user. Regardless of its type, a card can contain text, soft keys and images.

In one aspect and from the perspective of a browser operating HDML, choice and entry cards prevent a user from moving to the next card until the requested information is received from the user. When the user reaches the last card in a deck and hits a corresponding key, a request for a new deck is initiated. The deck requested is determined by either the deck that the user has completed, or by the choices made by the user. When the deck is completed, the choices and/or data entered by the user are typically transmitted along with the request to a network server for a new deck. When a deck containing multiple cards is received and stored in a cache memory, the browser fetches the first card in the deck, displays the information in the card, and allows the user to respond thereto. Depending on the card type, the user responds by entering text or choosing an option, and then pressing a predetermined key to transact the response.

Figure 7E:
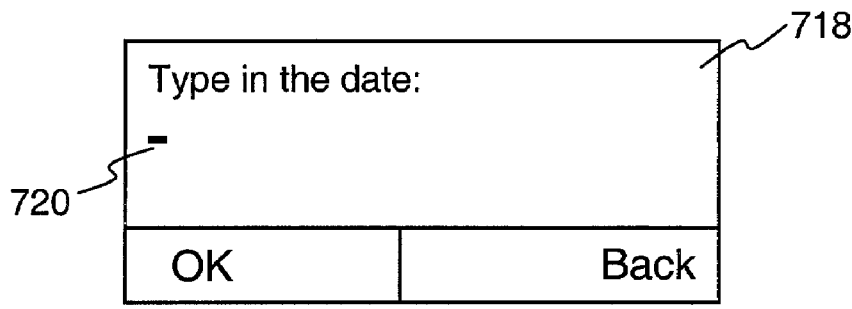

FIGS. 7A through 7G should be understood in conjunction with FIG. 6 and with reference to FIG. 3. Upon establishing a communication session between mobile device 602 and server device 604, an initial HDML deck transmitted to link server 606 includes an introductory display card and a choice card. FIG. 7A is an example of introductory screen display 702 that is ultimately drawn on a display screen 700 of mobile device 602 by interface engine 616. FIG. 7A and the following figures are not interpreted directly from the HDML decks received, rather are interpreted from corresponding screen description data translated in link server 606 according to the HDML decks received therein. As described above, if working directly with the HDML files, the terminal (i.e., the mobile device) would require both considerable memory to cache the HDML files, history and activity states and sufficient computing power to run a browser to work with the cached HDML files. One aspect which differentiates the present invention fundamentally from prior art systems is that the control engine in the link server is responsible for tasks that require computing resources while the interface engine in the terminal is only responsible for rendering the screen description data to cause the display screen to display contents and receive inputs from a user. More specifically, the typical functions that the control engine in the link server perform include:

1. processing requests from the mobile device;
2. generating a URL request to a network server;
3. interpreting markup language files;
4. generating screen description data;
5. management of data cache;
6. management of history;
7. management of variable states in a markup language file;
8. maintaining push data, including alerts, electronic mails.

According to one embodiment, display screen 700 displays a graphical image. In another embodiment, display screen 700 displays only text. Screen display 702, and other screen displays described more completely below, include a horizontal arrow 704, i.e., a multi-screen indicator translated from a multi-card deck indicator, to communicate to the user that screen display 702 includes another screen display. To view the HDML file, a multi-card deck indicator indicates that the current deck includes another card. The inclusion of screen indicators, such as horizontal arrow 704, to communicate with the user is optional. The functionality of this invention is independent of such screen indicators.

Referenced by 706 is a soft key generally associated with one of the generic buttons in the keypad of the mobile device 602. A soft key can be used to map a generic button into a specified button or activated by a touch pen or a finger. In this instance, pressing the generic button or touching the key directly is equivalent to pressing an "OK" button when the soft key OK is displayed. In many palm-sized computing devices, the number of the keys is generally kept to a minimum so as to provide a larger display screen. The larger display screen can accommodate more soft keys, which can be directly activated using a touch pen. Soft keys thus provide an efficient means to interact with display screen 700.

When the user depresses a predetermined key (i.e. one of the generic buttons in this case), thus selecting a soft key, a client module in the mobile device 602 interprets the action and sends a request to link server 606. Upon receiving the request, control engine 609 in link server 606 interprets the request which is, in this instance, a request to display the next screen display. Control engine 609 calls converter 612 to retrieve the next card from the received HDML deck, preferably, cached in a memory in the link server and converts the card in HDML to a SDD file that is subsequently delivered to mobile device 602. Upon receiving the SDD file, interface engine 616 draws a new screen display as shown in FIG. 7B.

Screen display 708 in FIG. 7B shows a list of choices (the original HDML card is a choice card). Besides a list of choices that can be accessed by the user in FIG. 7B, there is a downward arrow which indicates that the screen display includes additional items that are not shown in display screen 700. The screen display can be larger than the number of lines available in the display screen 700 and so the user must scroll the screen display to view the complete screen. Thus, to view the additional items, the user presses the downward arrow key corresponding to the downward arrow indicator 712 on the display screen 700. In this embodiment, when the downward arrow key is pressed, each line of the display is rolled up one line. The resulting display has an icon with an upward arrow (not shown) if the menu requires only two screen displays. If the menu requires more than two screen displays, the second screen display of the menu would have two icons, one with the upward arrow and another with the downward arrow. To scroll between the various lines in the second menu, the user uses the downward arrow key, and the upward arrow key. If the user displays the last line of a card, e.g., the last line in the second menu, and presses the downward arrow key nothing would happen because the downward arrow icon, another soft key, will not be present. In this screen display, the user must make a choice before a next display screen is available.

In this embodiment, each of the menu items is available on service server 604 or distributed on several server computers coupled to network 608. As explained more completely below, each of the menu items in the original HTML file is associated with a numeral that corresponds to a resource locator in the card containing the menu items. The resource locator includes an address of a particular object associated with one of the menu items. In general, a resource locator includes a universal resource identifier (URI) or universal resource locator (URL) and may include appended data. The address can be referenced to another card in the deck cached in link server 606 or to a remote object on service server 604.

As shown in FIG. 7B, the first item in the menu 708 is initially indicated by an arrow 710 as a pre-chosen item. If the user decides to proceed with the pre-chosen item, the soft key "OK" may be pressed. Alternatively, a numbered key "1", i.e. one of the 10 numbered keys, can be pressed to cause the client module in mobile device 602 to send a new request to link server 606 for a next screen display. This new request, however, is not a simple request as the one from FIG. 7A. This request may include a resource locator to another card in the deck cached in link server 606 or a remote object in service server 604, depending on whether the original received HDML includes the information requested by the new request from mobile device 602.

This new request corresponds to a hyperlink in the card that has been converted to the SDD file currently being displayed in FIG. 7B. The hyperlink may include a URL as follows:

http://www.xyzinfo.com/ABCcorp/saleswww.xyzinfo.com/Softcorp/sales where www.xyzinfo.com can be the URL of service server 604 and /sales may be a hyperlink in an object identified by /Softcorp in service server 604. More specifically, the card in the original HDML file may be expressed as follows:

```
<HDML version="2.0">
    <CHOICE>
        <CE TASK =   GO DEST=www.abc.com/sales.hdml>
                     ABC Corp. Sales
        <CE TASK =   GO DEST=www.xyzinfo.com>
                     XYZ Information
        <CE TASK =   GO DEST=www.financialinfo.com>
                     Financial Info
        <CE TASK =   GO DEST=www.personalweb.com>
                     Personal Web Site
    . . .
    </CHOICE>
</HDML>
```

In the present example, each of the items in the menu displayed in FIG. 7B corresponds to a URL in the following, identifying a network server in the Internet:

www.abc.com/sales.hdml
www.xyzinfo.com
www.financialinfo.com
www.personalweb.com When one item is subsequently chosen, the control engine will generate a URL request to the identified network server to retrieve the desired information.

Although converter 612 in link server 606 converts the above code to a SDD file, a much more compact format for transmitting over wireless network 614. A long address, like http://www.xyzinfo.com/LocalNews/Towns, typically cannot be compressed further. It is neither efficient nor wise to use the wireless network to communicate a number of long addresses in a file and return a URL request containing one or more of the addresses. Hence the present invention uses one or more address identifiers that are communicated over the wireless network. Each of the address identifiers identifies the full address. An address table is maintained in link server 606 that maps the address identifiers to the actual (full) addresses. The address identifying or address mapping methods described here are significantly different from prior art systems which send addresses to all hyperlinks in a markup language document along with the document to a terminal device.

Figure 8A:
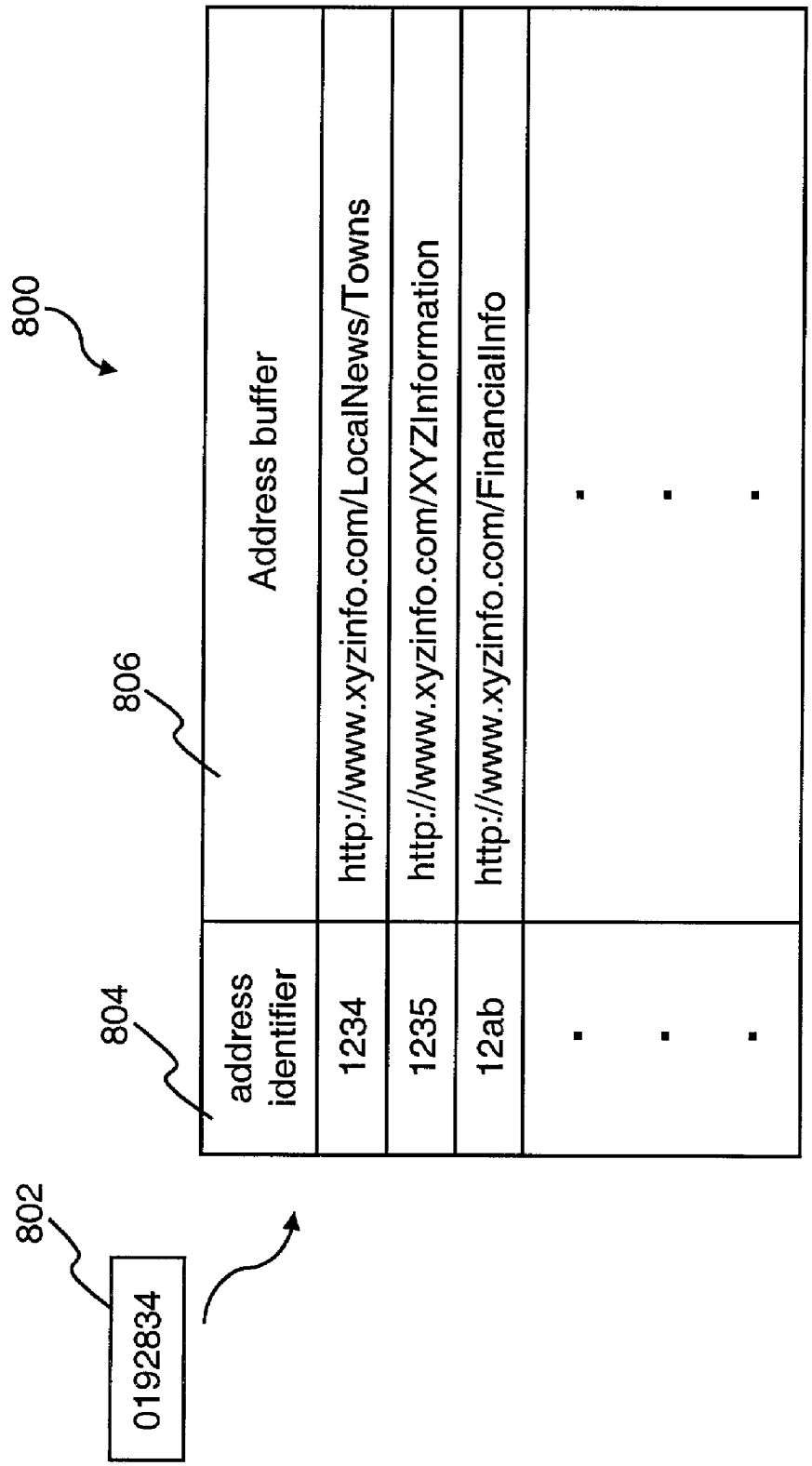
FIG. 8A demonstrates an address table per device to send an address identifier to an actual IP address over a wireless network.

FIGS. 8A and 8B show, respectively, two implementations of address mapping and should be understood in conjunction with FIG. 3 and FIG. 6. Address mapping table 800 is identified by a user ID 802. Address mapping table 800 includes address identifier column 804 and addresses into address buffer 806. Address mapping table 800 in FIG. 8A is typically established when a communication session between a mobile device and a link server is created. Each mobile device is allocated one address mapping table, and can be managed by the account manager in the link server. In other words, user ID 802 (e.g., a device ID or a subscriber ID) associates uniquely a mobile device to address mapping table 800. During the communication session, only the entries in address identifier column 804 are actually sent. For example, rather than sending over the entire resource locator http://www.xyzinfo.com/LocalNews/Towns, address identifier "1234" is embedded in a SDD file that is delivered to the mobile device. Generally mapping table 800 in FIG. 8A vanishes when the session expires or terminated.

According to another embodiment, the account manager manages an address mapping table 800 shown in FIG. 8B, in which user ID column 802 includes identifications (e.g. device ID or subscriber ID) of all active mobile devices communicating with the link server. Address identifiers 804 includes all address identifiers corresponding to the actual addresses in address buffer 806. Thus, whenever a mobile device refers an address identifier to a resource locator, the actual address is retrieved from address buffer 806 using the address identifier and used in a URL request generated by the control engine to the identified network server.

According to another embodiment in which the SDD is a group of Imp data, the actual addresses are mapped to their relative positions in a final screen display. For example, the above four URLs are hyperlinks, according to the original HDML file, to be displayed one in each of successive lines. Thus their relative positions, line1, line2, line3 and line4, each corresponds to one of the URLs. The relationships between the relative positions and the actual URLs may be maintained in the address table discussed above or directly by the control engine. If a user eventually chooses one of the hyperlinks, a (client) request from the mobile device will include the chosen position. The request may be expressed as follows:

client request={SeqID, link, topline};

where "SeqID" ensures that the client request is synchronized with the Imp data fetched to the mobile device, from which the client request is produced, "link" is one of the parameters that indicates which link (URL) is chosen and "topline" is the position in the screen display from the Imp data. For example: client request={64, 2, 0}; Upon receiving the client request, the control engine processes the request and produces an updated request including the actual URL corresponding to the chosen position, for example {"http://www.xyzinfo.com"}, which causes a connection to the service server identified by the URL.

Returning to FIG. 7B, the user may scroll the choice arrow 710 downward if the pre-chosen item is not a wanted one. It should be noted that scrolling to a selected item is a feature that is specific to this example, and in general is not required to implement the invention. Other methods can be used to indicate the user's choice on display screen 700 such as a horizontal highlighting strip overshadowing the choice, if such an indication is desired. As described above, the user may simply key in one or more numerals to select an item that is of interest.

As described above, screen display 716 also includes the representations of two soft keys, an OK key 706, and a Back key 714. In this example, these soft keys are defined only for the card used to generate screen display 716. The "OK" key allows the user to proceed with the chosen item and the "Back" soft key allows the user to go back the previous screen display if so desired. In the present invention, the "Back" soft key may generate a request that is sent over to the link server from which the previous screen display is fetched again. Other keys can be implemented. For example a "Home" key, resulting in a request that returns the user to screen display 708 of FIG. 7B. The "Home" key may be associated with a resource locator identifying the card representing screen display 708. Specifically, the link server manages a limited history stack of recent requests made by the mobile device in a memory. When a request is made, the control engine looks up the history stack to see if the request is an "old" one. For example, when the "Home" key is pressed, the request can be found in the history stack and the contents, either in the form of an HDML card or an SDD file, can be retrieved from memory and forwarded to the mobile device for display.

As shown in FIG. 4C, the user moves arrow 710 downward to the second item. Display screen 716 shows four menu items numbered consecutively. As described above, the downward arrow indicates that there are more items in the next screen. Each of the items has an address identifier. For example, for the first four items, the respective address identifiers may be:

12ab
231a
abc3
1629 each address identifier correspond to an address stored in the address buffer of link server 606:

www.abc.com
www.xyzinfo.com
www.financialinfo.com
www.personalweb.com

When the second item (i.e., 231a) is chosen, www.xyzinfo.com is intended. After a predetermined button is pressed (e.g., the soft key OK or the numbered button "2") is pressed, a request including the address identifier for the selection is transmitted to link server device 606 by the client module in mobile device 602 over network 614. Alternatively with regard to the specific Imp data implementation, the request includes the selection in terms of the relative position in a display screen as described above. In response to the selection, control engine 609 processes this request and formulates a new or updated request containing the actual URL identified in the client request, which causes a connection to service server 604. Through the server module, the link sever receives another HDML deck file from service server 604. Upon receiving the new HDML deck, message processor 610 processes the deck for the desired card and sends a corresponding SDD file derived from the desired card to mobile device 602.

In FIG. 7D, there is shown a new screen display 718. Typically, it is from one of the cards in a new deck received in the link server as a result of the request from screen display 716. The deck is cached in the link server and the first choice card is converted to a SDD file that is rendered by the interface engine in the mobile device for display. If the user proceeds with any of the items, for example, "Local News", a request is made from the interface engine in the mobile device and received by the corresponding control engine in the link server. The control engine causes the message processor to retrieve a card identified by the request from the cache and convert the card to a SDD file and forwards the file to the mobile device for display.

Figure 7F:
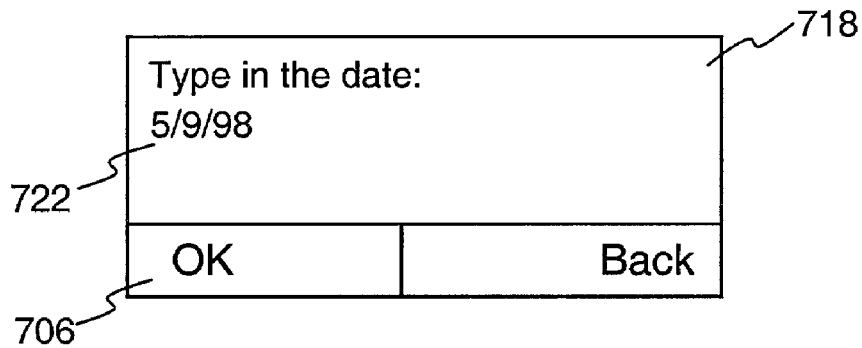
Figure 7G:
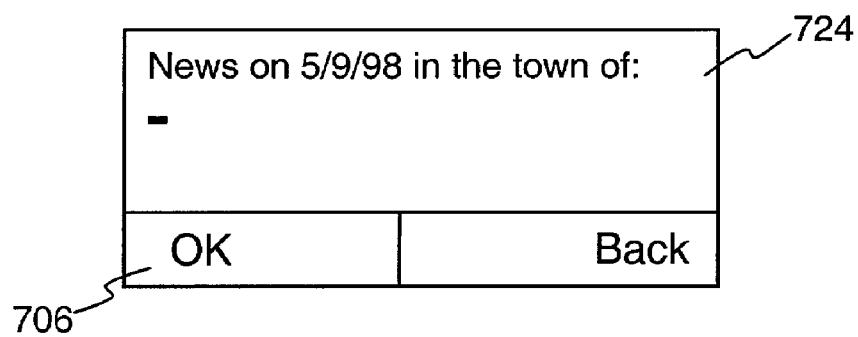

FIG. 7E shows a display screen 718 resulting from the "Local News" request. Display screen 718 asks the user for specific date information so that the news corresponding to the specified date can be provided. The original HDML card that corresponds to display screen 718 is an entry card that requires an input from the user. Hence the corresponding SDD file converted from the HDML entry card requires the input at cursor 720. FIG. 7F shows that the input 722, i.e. date information, is typed in. Upon pressing soft key "OK" 706, the interface engine sends a request including the input data to the control engine that performs variable substitutions. Variable substitutions, permitting sharing of data between cached cards, substitute the variable in the original HDML card with the actual information. As a result, an updated HDML card is locally and dynamically generated and then converted to a new SDD file that is returned to the interface engine for display. FIG. 7G shows a screen display 724 with the substituted data information. In this example, the updated HDML card is another entry card, hence screen display 724 asks for further information in order to deliver accurate information to the user. If the user supplies the "town" information being requested and presses the "OK" soft key, a request is made and sent to the link server in which the supplied information is used to substitute a corresponding variable and an updated request with the date and town information is generated. Typically, the updated request is sent to the network server supplying the information, but the updated request may be filled locally in the link server if the original HDML deck is large enough to include the desired information. Further detailed description of the management and processing of the variables in a markup language file is provided in commonly assigned U.S. patent application Ser. No. 09/071,235 entitled "Method for Inline Variables Management in a Hypermedia Display Language" by Peter F. King et al, which is hereby incorporated by reference in its entirety.

FIGS. 9A to 9G together constitute a process flow diagram showing the process performed by a link server device and a mobile device according to one embodiment of the present invention and should be understood in conjunction with FIGS. 3A to 3B and FIG. 6. At 904, link server device exchanges information with the mobile device to establish a communication session. The request to establish a communication session is initiated from the link server by sending a message to the targeted mobile device. The message includes a device identification of the mobile device. Upon receiving the message, the mobile device starts exchanging information with the link server. The exchanged information may establish the encryption keys and the encryption scheme to be used for the session. In addition, the mobile device delivers to the link sever a set of device characteristics information regarding the type and size of the display screen of the mobile device. At 906, the account manager in the link server associates the device information with the session just established. Typically the device information is cached in a memory along with other information about the mobile device. If the mobile device is an authorized device, there is a corresponding account that was established when the mobile device is activated. If the mobile device contacts the link server the first time, an account is established by the account manager. Therefore, the device characteristics information is always associated with the account of the mobile device.

At 908, the account manager assigns a control engine to work in conjunction with the interface engine in the mobile device. At 910, the account manager detects, through the server module, any message arrived. At 912, the source of the message is identified (i.e., whether the message is received from a network server or from the mobile device).

At 914, when the received message is from the network server, the control engine along with other modules in the link server determines the message type. In this embodiment, there are primarily two message types that are processed distinctively from the prior art systems. Specifically, these message types are notifications and markup language (ML) files. The notification or alert message indicates the arrival of an electronic mail or fulfillment of certain requests (e.g., sale of a stock at a limit price). The notification or alert message includes a device identification identifying the mobile device, an alert type (instructing the mobile device to beep, vibrate or display a visual sign), an alert title (a text string describing the subject matter of the alert), a life-time specifying a time period during which the alert should be delivered) and a URL that a user can request when the user desires to respond to the alert. Alternatively, an alert can be expressed as follows:

Notification$_{alert}$={023, "new mail", 4, www.wireless.com/mail retrieval/87473} where "023" a special code that can causes the mobile device to beep, the title "new mail" is then displayed on the screen of the mobile device, the value "4" specifies that the notification message be delivered within four hours or discarded, and the last entry in the notification is the URL to retrieve the new mail identified by "87473" from a mail server identified by www.wireless.com.

As indicated above, a notification or alert message is not always immediately deliverable; sometimes the mobile device is out of the service area or the mobile device is turned off. Consequently, the account manager of the link server maintains a notification list or an alert list for each mobile device. Upon receiving a new alert message, at 916, the account manager determines from an alert list if the newly arrived alert message correspond to a URL already on the alert list. If there is an identical URL in the alert list, at 920, the corresponding entry in the alert list is updated with the newly arrived alert message. If no identical URL is found, at 922 the newly arrived alert message is inserted. The newly arrived alert messages are sequenced in the alert list for delivery to the target mobile device.

At 924, the alert message is modified by substituting the actual URL by an address identifier retrieved from an address table. At 926, the modified alert message is sent to the mobile device over the wireless network. It should be pointed out that the above alert list update is not necessary if the newly arrived alert message is immediately delivered. Further it should be pointed out that the alert list may not be necessarily maintained in the link server device and, as will be explained below, may be maintained in the mobile device.

Returning to 914, wherein the received message from the network is a markup language (ML) files. At 938, the message processor in the link server processes the ML files. The processes at 938 may include caching the ML files in proper memory, parsing the ML files to generate internal data structure needed to generate SDD files. In particular, at 940 and 942 all the URLs in the received ML files are substituted by corresponding address identifiers, with the actual URLs stored in the address table maintained in the link server or the relative positions of the URLs are determined with regard to the Imp data implementation. At 944, the message processor converts the processed ML files to SDD files corresponding to the mobile device's characteristics information, to allow proper display of the SDD files in the mobile device. To ensure that the control engine in the link server is in synchrony with the interface engine in the mobile device, at 946, the SDD files are respectively sequenced, preferably numbered consecutively and, at 948, delivered to the mobile device over the wireless network.

Returning to 912, wherein the message is from a mobile device. Typically, such a message includes one or more (client) URL requests. At 960, the control engine processes the message after the account manager verifies that such requests are permissible at 958. Depending on the services subscribed, each mobile device serviced by the link server may have the different privileges from other mobile devices to the services offered by the link server. If a request is granted at 958, the link server processes the request. Collectively, a (client) request may be expressed as follows:

client request={SeqID, Event, Choice, Link, AlterID, Topline, Entry, URL} where "SeqID" ensures that the client request is synchronized with a SDD fetched to the mobile device, from which the client request is produced. "Event" indicates what kind of request this client request is, for example, Softkey meaning a soft key activation, AlertSelect meaning that an alert has been responded to fetch a message in reference to the alert, and "Accept", "GotoURL" and "DeleteSelect", to name a few. "Choice" indicates which choice in a screen display has been chosen. "link" is one of the parameters that indicates which link (URL) is chosen. "AlterID" comprises one or more those address identifiers. "Topline" is the position in the screen display from the SDD and "Entry" typically holds inputs entered by a user and "URL", as the name suggests, holds an address enter by the user.

At 960, the request is processed. Generally, the request is to request information. In some instances, at 962, variables in the requests are substituted to provide an updated request, as explained below.

According to one aspect of the invention, variables are used to hold user input data. Such user input data can be collected, for example, in response to a query provided to the user in a display screen. When the user input data (e.g., a number) is entered by the user, the user data received is provided on the next display screen to provide feed back to the user. Specifically, the link server receives an ML file in which are defined a number of variables. The variables in the ML file constitute information to be requested at a terminal device. When the ML is converted to a corresponding SDD file to be displayed on the mobile device, in response to the display screen, the user enters the required input data and a request is dispatched containing the input data to the link server, after a predefined key is pressed. In prior art systems, a terminal device running a browser performs the substitutions locally. In the present invention, the mobile device operates only an interface engine without the capability of performing the substitution. The substitutions are performed by the control engine in the link server when the request from the mobile device is received at 964. The link server responds to the request by sending the mobile device a new SDD file that has the user data substituted for the variables at 966.

According to another aspect of the present invention, some values received from the mobile device for variables in the ML files are provided as address identifiers that must be substituted with the actual URLs. Examples of a request including address identifiers include a new information request to a network server or a request to retrieve email. Upon receiving such a request, the actual URLs are retrieved by the account manager from an address table in the link server. At 968, the original requests from the mobile device are modified to produce updated requests with the actual URLs substituted and the updated requests are then sent to the identified network server(s) corresponding to the URLs at 970.

Figure 9A:
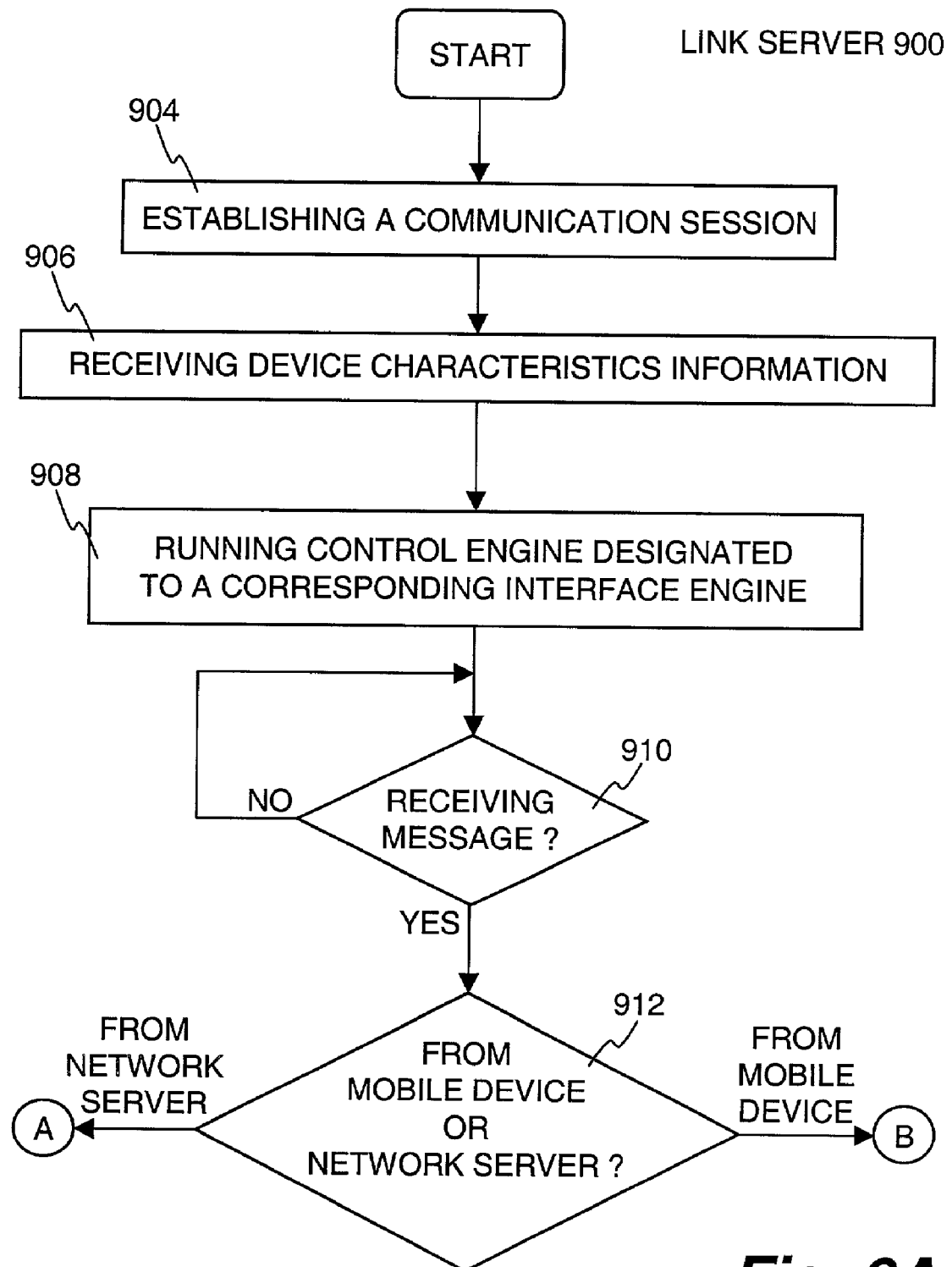
FIGS. 9A and 9G illustrate a process flowchart of the present invention according to one embodiment.
Figure 9B:
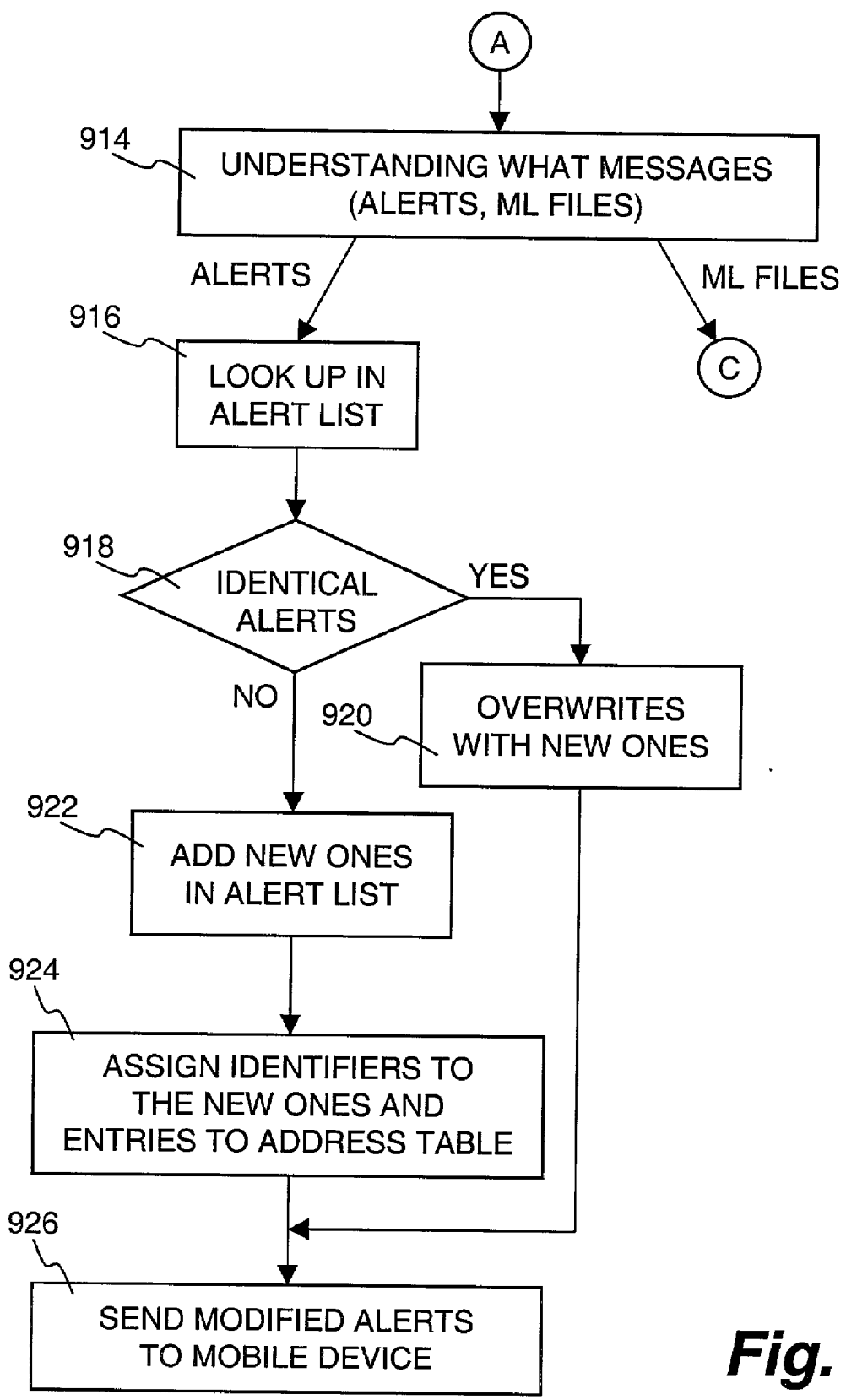
Figure 9C:
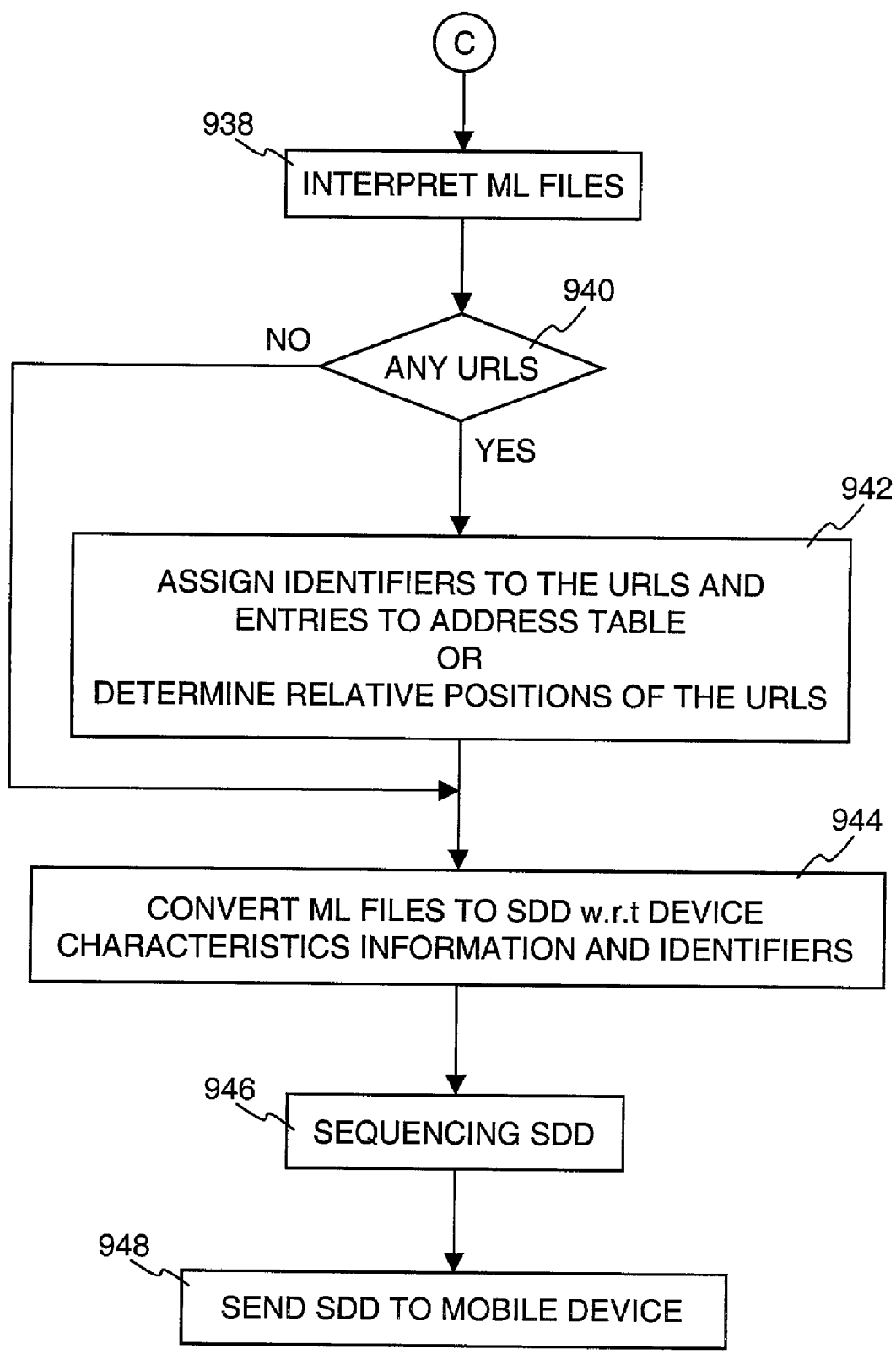
Figure 9D:
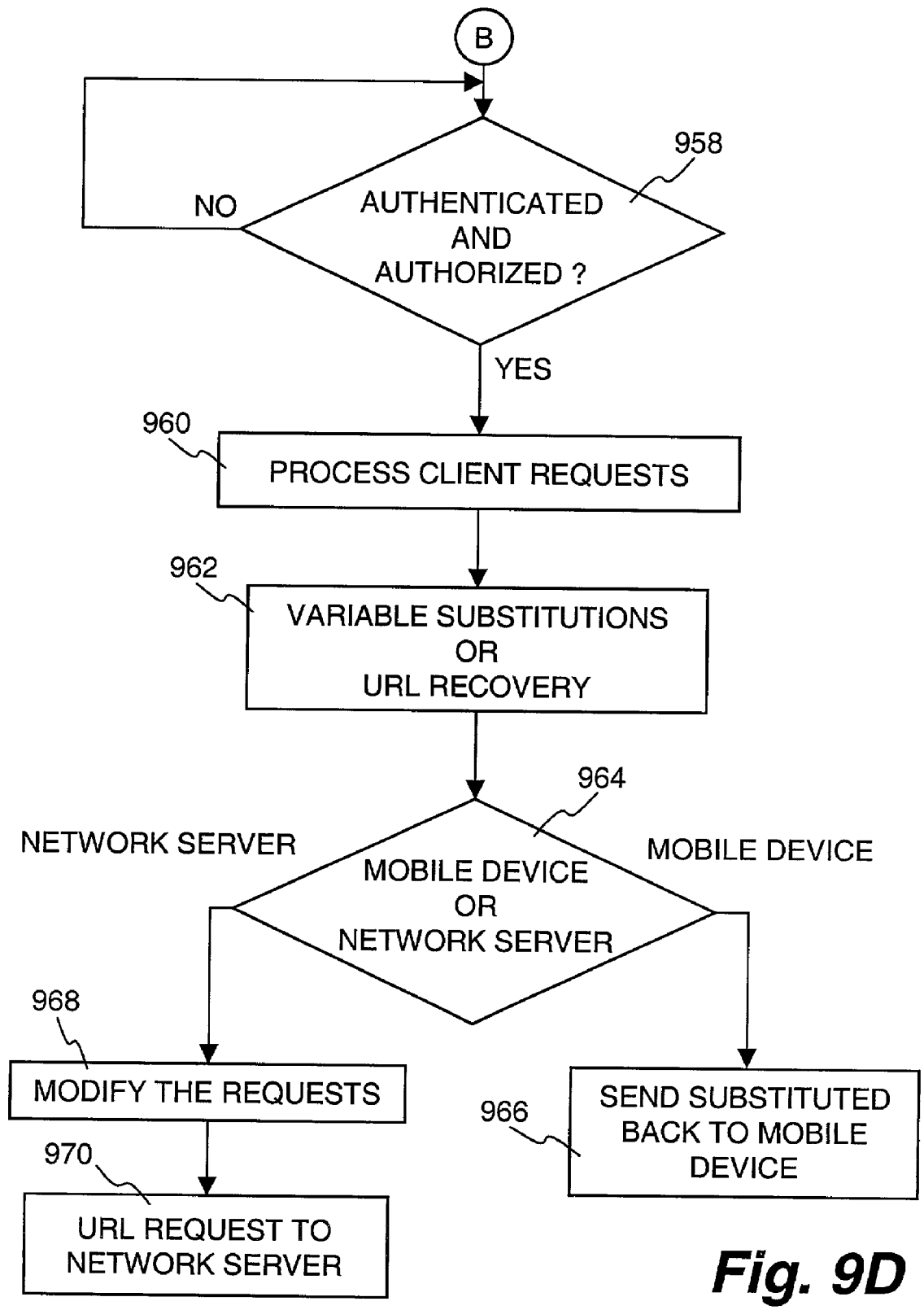
Figure 9E:
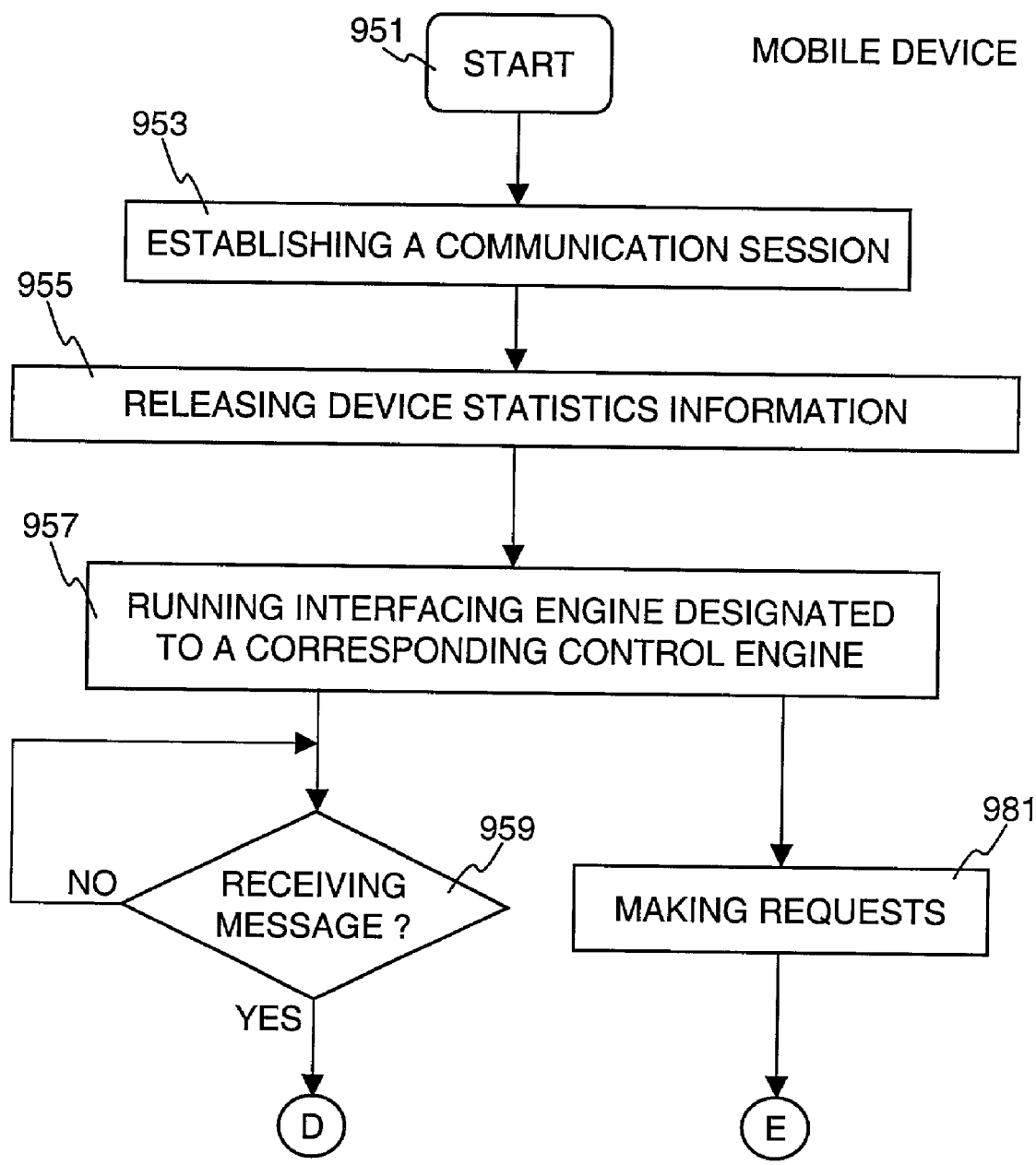
Figure 9F:
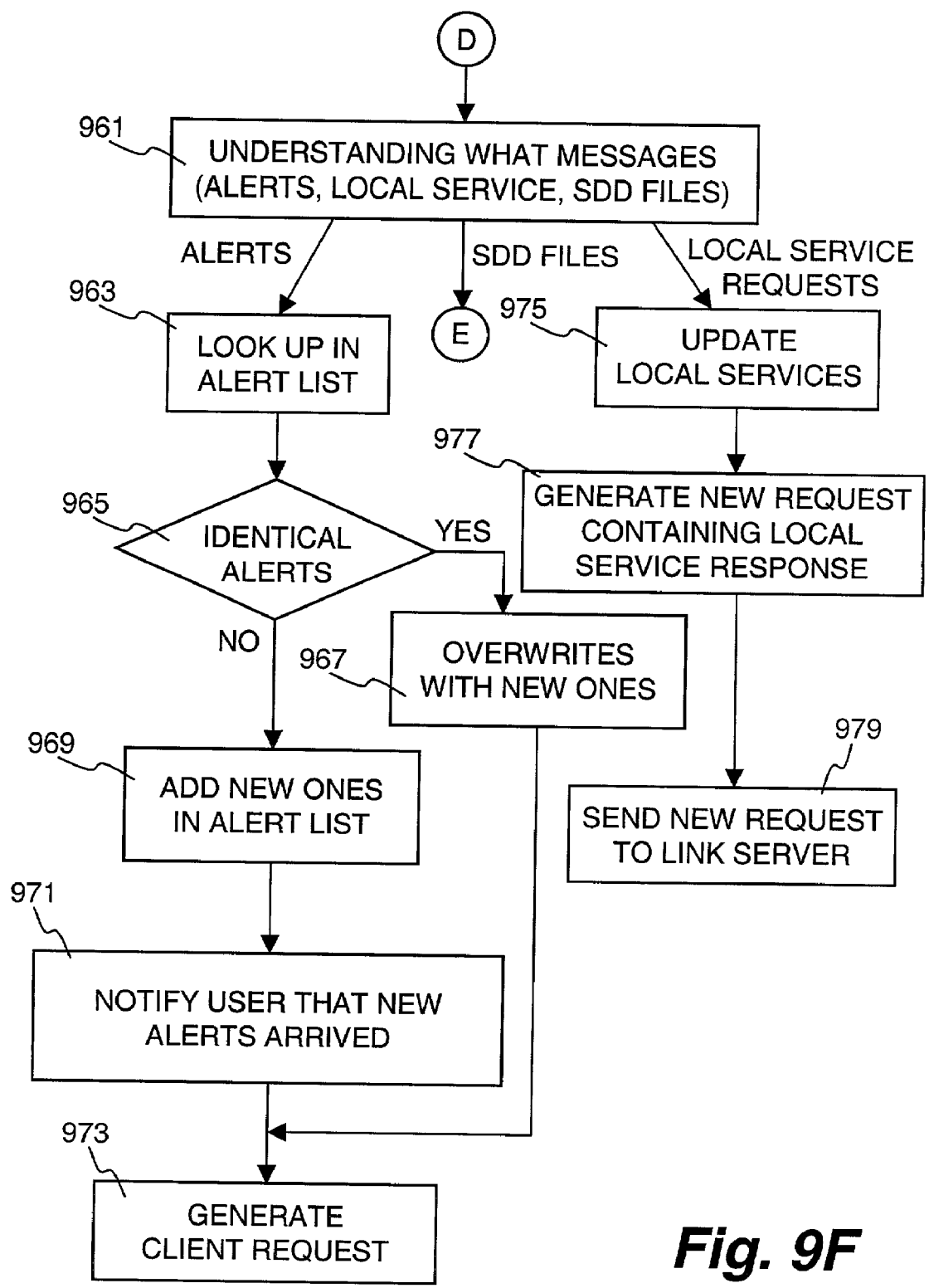
Figure 9G:
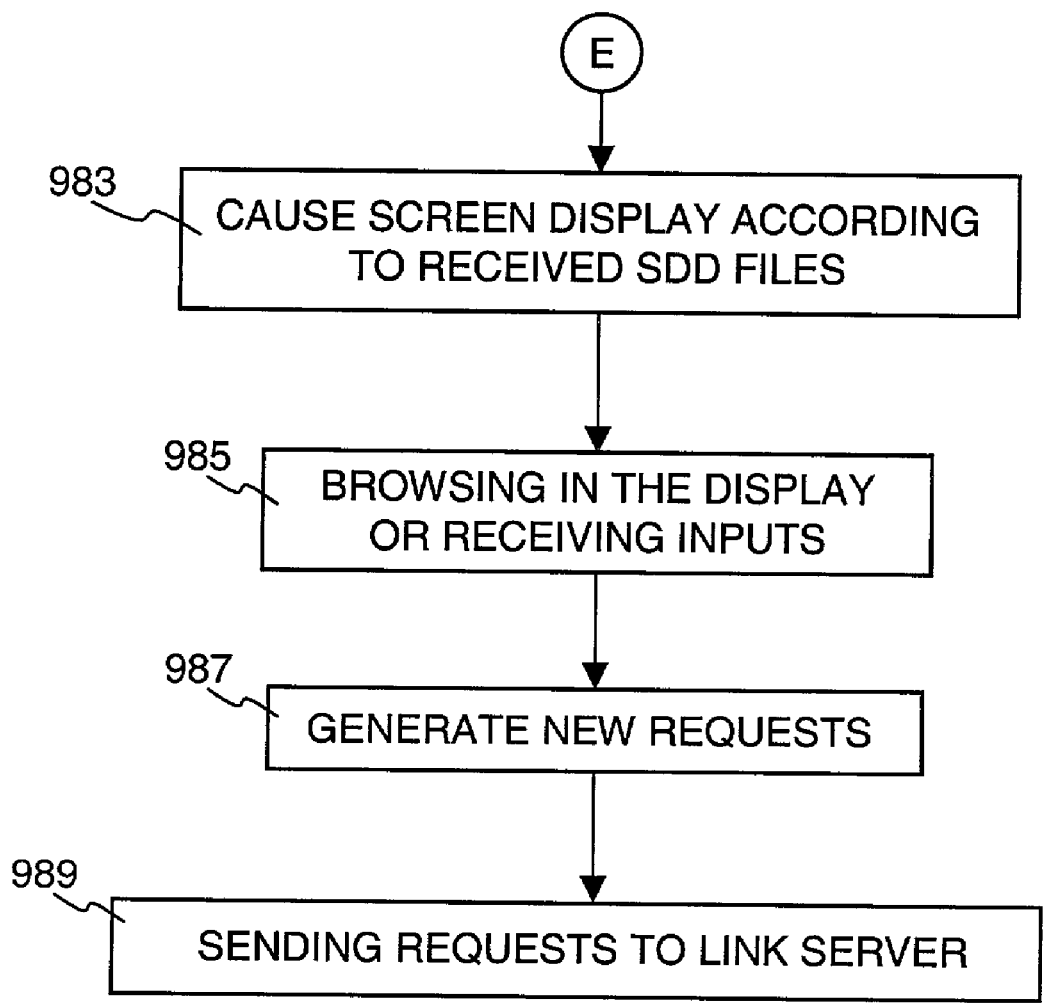

FIGS. 9E to 9G constitute a process flow diagram of the mobile device, which corresponds to processes in the link server. At 953, the mobile device exchanges information with the link device to establish a communication session. The request to establish a communication session can also be initiated from the mobile device by sending a message to the link server. Besides a device identification of the mobile device, the message includes a URL of the link server. To establish the communication session, device characteristics information is released to the link server. Such characteristics information may include the size and type of the display screen of the mobile device. After the communication session is established, the interface engine works at 957 with the control engine in the link server.

At 959, the client module in the mobile device receives a message. Typically the mobile device receives three kinds of messages: notifications, SDD files and local service requests. At 963, a notification message arrives. Note that a notification message received at the mobile device is different from the notification or alert message provided from a network server. The notification message received at the mobile device is a distilled version with no explicit URLs. Upon receiving the notification message, the client module looks up in an alert list in the mobile device to determine if there is an identical notification pending there at 965. Sometimes a user of the mobile device may not necessarily or immediately respond to an alert, the mobile device hence maintains an alert list to keep all the received notification or alerts. If a notification identical to the newly received notification message is found, the alert list gets updated with the newly arrived notification message at 967. Otherwise, i.e., no identical notification message is found in the alert list, the newly arrived notification message is added sequentially into the alert list at 969. Meanwhile, the user is notified according to the alert type in the received notification message at 971. When the user decides to respond to the notification and presses a key or activates a soft key, a request corresponding to the notification message is sent to the link server at 973.

At 975, a message is received requesting an update to the local services in the mobile device. Local services may include functions for modifying wireless voice/date protocols, configuration or system parameters, bookmarks, addresses, subscriber provisioning information and other parameters that may enable or disable certain telephony and data features of the mobile devices. Technically, the interface engine recognizes such a message by a special prefix indicating a "local service" request. According to one embodiment, a URL for a local service always begins with "device:". (e.g., device:addressbook).

Upon the arrival of a local service request, the local service in the mobile device is invoked. For example, a user may navigate to a page providing email service to the mobile device. After a key is pressed or a soft key is activated, a request is sent to the control engine of a link server, which in turn responds by a local service request which causes an address book to be displayed in the mobile device. After the user makes a selection from the address book, at 977, the mobile device sends another request specifying the selected address to the control engine which then sends the mobile device an SSD file. Upon receiving the SSD file, the display screen displays a page which allows the user to proceed with composing a mail message.

At 981, when the received message is an SDD file. Upon receiving the SDD file, the interface engine renders the SDD file and causes the display screen of the mobile device to display according to the SDD file at 983. Within the display screen, the user may browse the screen display at 985 by pressing a navigation key to reposition a cursor to a subject of interest. For further information on the selected subject, the user may press a predefined key; hence a URL request is generated at 987. Also at 985, the user may be asked for input data to some context. Once the input data is entered, the user may press a predefined key, such as the "OK" key to generate a URL request at 987. The URL request is then sent to the link server for processing at 989.

The present invention is described above by way of example using specific embodiments. Numerous changes and modifications can be made within the scope of the invention claimed below.

What is claimed is:

1. A method comprising:
   receiving at a link system a first resource request from a thin-client mobile device over a wireless network;
   using a control engine in the link system to process the first resource request;
   receiving a message at the link system from a resource on a landnet, the message corresponding to the first resource request; and
   converting the message in the link system to a more compact format to facilitate transmission of the message over the wireless network, including substituting a uniform resource identifier in the message with a corresponding address identifier while maintaining the uniform resource identifier in the link system, the converted message for use by an interface engine in the thin-client mobile device to render information on a display device of the thin-client mobile device, wherein the interface engine uses substantially less computing resources than the control engine.

2. A method as recited in claim 1, wherein said converting the message comprises converting the message in the link system to screen description data that can be directly rendered on the display device of the thin-client mobile device by the interface engine.

3. A method as recited in claim 1, further comprising transmitting a second resource request from the link system to a network server over a landnet based on a result of processing the first resource request.

4. A method as recited in claim 3, wherein the network server includes said resource, and wherein the message is in response to the second resource request from the link system.

5. A method as recited in claim 4, wherein the message comprises a mark-up language file, the method further comprising using the control engine in the link system to interpret the mark-up language file.

6. A method as recited in claim 1, further comprising:
   initiating the control engine in the link system only after communication has been established between the link system and the mobile device; and
   associating the control engine with the interface engine operating in the thin-client mobile device.

7. A method as recited in claim 1, wherein said using the control engine in the link system comprises using the control engine to manage a data cache in the link system.

8. A method as recited in claim 1, wherein said using the control engine in the link system comprises using the control engine to manage variable states of data accessible to the mobile device.

9. A method as recited in claim 1, wherein said using the control engine in the link system comprises using the control engine to manage push data to be sent to the mobile device.

10. A method as recited in claim 1, further comprising managing a user account of the mobile device in the link systems.

11. A method as recited in claim 1, further comprising using the interface engine in the mobile device to receive input from a user of the mobile device.

12. A method of allowing a two-way communication mobile device on a wireless network to access a network server on a landnet, the method comprising:
   managing a user account of the mobile device in a link server coupled to the landnet;
   establishing a communication session in the link server, to allow communication between the link server and the mobile device over the wireless network;
   initiating a control engine in the link server after the communication session has been established;
   associating the control engine with an interface engine operating in the mobile device corresponding to the user account;
   using the control engine in the link server to process a first request from the mobile device and to generate a second request to the network server in response to the first request;
   receiving a message at the link server from the network server over the landnet; and
   converting the message in the link server to a compact data file to facilitate transmission of the message to the mobile device over the wireless network, including substituting a uniform resource identifier in the message with a corresponding address identifier while maintaining the uniform resource identifier in the link server, the compact data file to be rendered on a display device of the mobile device by the interface engine in the mobile device, wherein the interface engine uses substantially less computing resources than the control engine.

13. A method as recited in claim 12, wherein said converting the message comprises converting the message in the link system to screen description data that can be directly rendered on a display device of the thin-client mobile device by the interface engine operating in the thin-client mobile device.

14. A method as recited in claim 12, further comprising using the control engine in the link server to interpret a mark-up language file received from the network server.

15. A method as recited in claim 12, further comprising using the control engine to manage a data cache in the link server.

16. A method as recited in claim 12, further comprising using the control engine in the link server to manage variable states of data accessible to the mobile device.

17. A method as recited in claim 12, further comprising using the control engine in the link server to manage push data destined for the mobile device.

18. A method as recited in claim 12, further comprising using the interface engine in the mobile device to receive input from a user of the mobile device.

19. A method as recited in claim 12, further comprising managing a user account of the mobile device in the link systems.

20. A method as recited in claim 12, wherein the message comprises a mark-up language file.

21. A method as recited in claim 20, wherein the method further comprises using the control engine in the link system to interpret the mark-up language file.

22. A link system comprising:
a processor;
a connection to a wireless network;
a connection to a landnet; and
a memory coupled to the processor and storing instructions which, when executed by the processor, cause the link system to perform a process that includes
receiving a first resource request from a thin-client mobile device on the wireless network;
processing the first resource request;
transmitting a second resource request to a network server over the landnet based on a result of said processing;
receiving a first message from a resource on the landnet; and
converting the message to a more compact format to facilitate transmission of the message over the wireless network, including substituting a uniform resource identifier in the message with a corresponding address identifier while maintaining the uniform resource identifier in the link system, the converted message for use by the thin-client mobile device to render information to a user of the thin-client mobile device.

23. A link system as recited in claim 22, wherein said processing the first resource request is done by a control engine in the link system;
wherein the thin-client mobile device uses an interface engine to render said information; and
wherein the interface engine uses substantially less computing resources than the control engine.

24. A link system as recited in claim 23, wherein said converting the message comprises converting the message in the link system to screen description data that can be directly rendered on a display device of the thin-client mobile device by the interface engine operating in the thin-client mobile device.

25. A link system as recited in claim 22, wherein the network server comprises said resource, and wherein the message is responsive to the second resource request.

26. A link system as recited in claim 22, wherein the message comprises a mark-up language file.

27. A link system as recited in claim 26, wherein the control engine interprets the mark-up language file.

28. A link server comprising:
an account manager to manage a user account of a thin-client mobile device on a wireless network;
a protocol interface to communicate with the thin-client mobile device over the wireless network;
a control engine to process a first request from the thin-client mobile device and to generate a second request for transmission to a resource on the landnet in response to the first request; and
a message processor to receive a message from the network server over the landnet and to convert the message to a compact data file to facilitate transmission of the message to the thin-client mobile device over the wireless network, the compact data file to be rendered on a display device of the thin-client mobile device by an interface engine operating in the mobile device, wherein the interface engine uses substantially less computing resources than the control engine; and
wherein the link server substitutes a uniform resource identifier in the message with a corresponding address identifier while maintaining the uniform resource identifier in the link server.

29. A link server as recited in claim 28, wherein the compact data file comprises screen description data that can be directly rendered on the display device of the thin-client mobile device by the interface engine.

30. A link server as recited in claim 28, further comprising transmitting a second resource request from the link system to a network server over a landnet based on a result of processing the first resource request.

31. A link server as recited in claim 30, wherein the network server includes said resource, and wherein the message is in response to the second resource request from the link server.

32. A link server as recited in claim 31, wherein the message comprises a mark-up language file, and wherein the control engine interprets the mark-up language file.

33. A link server as recited in claim 28, wherein the control engine manages a data cache in the link system.

34. A link server as recited in claim 33, wherein the control engine manages variable states of data accessible to the mobile device.

35. A link server as recited in claim 34, wherein the control engine manages push data to be sent to the mobile device.

36. A system, coupling a wireless network to a landnet, to enable an interactive two-way mobile communication device having a display screen to interact with a network server, wherein the mobile communication device is coupled to the wireless network and the network server is coupled to the landnet, the system comprising:
a memory storing code for a server module;
a data storage device to maintain a user account for the mobile communication device; and
a processor, coupled to the memory and the data storage device, to execute the code in the memory to cause the server module to:

execute a control engine associated with an interface engine executing in the mobile communication device;

receive a notification from the network server over the landnet using a first communication protocol;

buffer the notification;

examine whether there is an entry in a notification list maintained in the memory that is substantially equivalent to the notification;

replace the entry with the notification if there is an entry in a notification list maintained in the memory that is substantially equivalent to the notification;

insert sequentially the notification in the notification list if the entry is not substantially equivalent to the notification;

generate a compact message from the notification; and send the compact message to the mobile communication device over the wireless network using a second communication protocol.

37. A system as recited in claim 36, wherein the processor further executes the code in the memory to cause the server module to establish an account manager to manage a user account of the mobile communication device, and to use the user account to ensure that the control engine operates in concert with the interface engine.

38. A system as recited in claim 37, wherein the user account is established when the mobile communication device sends a request over the wireless network to establish a communication session with the server module.

39. A system as recited in claim 38, wherein the notification represents a World Wide Web page; and wherein the compact message is a screen description data file that can be directly rendered by the interface engine in the mobile communication device.

40. A system as recited in claim 39, wherein the notification comprises a markup language file.

41. A system as recited in claim 40, wherein the markup language file is in a markup language selected from the group consisting of: Handheld Device Markup Language (HDML), HyperText Markup Language (HTML), Wireless Markup Language (WML), Standard Generalized Markup Language (SGML) and Extensible Markup Language (XML).

42. A system as recited in claim 41, wherein the processor further executes the code in the memory to cause the server module to receive display characteristics information of the display screen of the mobile communication device when the communication session is established.

43. A system as recited in claim 42, wherein the compact message is generated from the notification with respect to the display characteristics information, such that contents in the notification can be properly displayed on the display screen of the mobile communication device according to the received compact message.

44. A system as recited in claim 43, wherein the notification requires inputs from a user operating the mobile communication device; and wherein, upon receiving a client request from the interface engine executing in the mobile communication device, the client request including inputs, the processor further is to execute the code in the memory to cause the server module to:

generate locally and dynamically a second message from the notification, the second message incorporating the inputs;

convert the second message into a second compact message; and return the second compact message to the mobile communication device over the wireless network, for use by the mobile communication device in producing a display.

45. A system as recited in claim 39, wherein the processor further is to execute the code in the memory to cause the server module to:

determine uniform resource identifiers in the notification;

substitute each of the uniform resource identifiers with one address identifier; and maintain an address table to keep the each of the uniform resource identifiers associated with the one address identifier.

46. A system as recited in claim 45, wherein, upon receiving a client request from the interface engine executing in the mobile communication device; the processor executes the code in the memory to cause the server module to:

retrieve each of the uniform resource identifiers from the address table with respect to the one address identifier; wherein the client request containing the one address identifier is generated when a user makes a selection in the mobile communication device;

generate an updated client request with each of the uniform resource identifiers therein; and forward the updated client request to the network server.

47. A system as recited in claim 36, wherein the notification comprises an alert type and a uniform resource identifier.

48. A system as recited in claim 47, wherein the processor further is to execute the code in the memory to cause the server module to:

substitute the uniform resource identifier with an address identifier;

maintain an address table to keep the uniform resource identifier associated with the address identifier;

generate from the notification an updated notification comprising the address identifier; and send the updated notification to the mobile communication device.

49. A system as recited in claim 48, wherein, upon receiving a client request from the mobile communication device, the processor further is to execute the code in the memory to cause the server module to:

retrieve the uniform resource identifier from the address table with respect to the client request including the address identifier;

generate from the client request an updated client request comprising the uniform resource identifier; and fetch information from a network server identified by the uniform resource identifier.

50. A method of enabling an interactive two-way mobile communication device coupled to a wireless network to interact with a network server coupled to a landnet, the method comprising:

operating a control engine in a link system coupled to the wireless network and the landnet, the control engine associated with an interface engine executing in the mobile communication device;

receiving a notification comprising an alert type and a network resource identifier from the network server at the link system over the landnet; and operating the link system to substitute the network resource identifier with an address identifier;

operating the link system to maintain an address table to keep the network resource identifier associated with the address identifier;

operating the link system to generate from the notification an updated notification comprising the address identifier; and operating the link system to send the updated notification to the mobile communication device.

51. A method as recited in claim 50, further comprising operating an account manager in the link system to manage a user account of the mobile communication device, the user account for use by the link system to ensure that the control engine operates in concert with the interface engine.

52. A method as recited in claim 51, further comprising establishing the user account in response to the mobile communication device sending a request over the wireless network to establish a communication session with a server module in the link system.

53. A method as recited in claim 50, wherein the notification represents a web page; and wherein the updated notification comprises a screen description data file that can be directly rendered by the interface engine in the mobile communication device.

54. A method as recited in claim 53, wherein the notification comprises a markup language file.

55. A method as recited in claim 54, wherein the markup language file is in a markup language selected from the group consisting of: Handheld Device Markup Language (HDML), HyperText Markup Language (HTML), Wireless Markup Language (WML), Standard Generalized Markup Language (SGML) and Extensible Markup Language (XML).

56. A method as recited in claim 50, further comprising operating the link system to receive display characteristics information of a display screen of the mobile communication device when a communication session is established with the mobile communication device.

57. A method as recited in claim 56, wherein the updated notification is generated from the notification with respect to the display characteristics information, such that contents in the notification can be properly displayed on the display screen of the mobile communication device according to the received updated notification.

58. A method as recited in claim 50, further comprising:
operating the link system to determine network resource identifiers in the notification;
operating the link system to substitute each of the network resource identifiers with one address identifier; and
maintaining an address table in the link system to keep each of the network resource identifiers associated with the one address identifier.

59. A method as recited in claim 58, further comprising, upon receiving a client request from the mobile communication device:
operating the link system to retrieve each of the network resource identifiers from the address table with respect to the one address identifier; wherein the client request containing the one address identifier is generated when a user makes a selection in the mobile communication device;
operating the link system to generate an updated client request with each of the network resource identifiers therein; and
forward the updated client request from the link system to the network server.

60. A method as recited in claim 50, further comprising:
operating the link system to examine whether there is an entry in a notification list maintained in the memory that is substantially equivalent to the notification;
operating the link system to replace the entry with the notification if there is an entry in a notification list maintained in the memory that is substantially equivalent to the notification; and
operating the link system to insert sequentially the notification in the notification list if the entry is not substantially equivalent to the notification.

61. A method as recited in claim 50, further comprising, upon receiving a client request from the mobile communication device:
operating the link system to retrieve the network resource identifier from the address table;
operating the link system to generate from the client request an updated client request comprising the network resource identifier; and
operating the link system to fetch information from a network server identified by the network resource identifier.

* * * * *